(12) United States Patent
Oh

(10) Patent No.: US 9,361,060 B2
(45) Date of Patent: Jun. 7, 2016

(54) DISTRIBUTED RENDERING SYNCHRONIZATION CONTROL FOR DISPLAY CLUSTERING

(71) Applicant: Samsung Electronics Co., Ltd., Suwon-si, Gyeonggi-do (KR)

(72) Inventor: Seongnam Oh, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/174,795

(22) Filed: Feb. 6, 2014

(65) Prior Publication Data

US 2014/0229998 A1 Aug. 14, 2014

Related U.S. Application Data

(60) Provisional application No. 61/762,805, filed on Feb. 8, 2013.

(51) Int. Cl.
| | |
|---|---|
| *G06F 3/14* | (2006.01) |
| *G09G 5/12* | (2006.01) |
| *H04N 21/41* | (2011.01) |
| *H04N 21/43* | (2011.01) |
| *H04L 29/06* | (2006.01) |

(52) U.S. Cl.
CPC ............... *G06F 3/1446* (2013.01); *G09G 5/12* (2013.01); *H04L 65/602* (2013.01); *H04L 65/607* (2013.01); *H04L 65/80* (2013.01); *H04N 21/4122* (2013.01); *H04N 21/4307* (2013.01); *G09G 2300/026* (2013.01); *G09G 2356/00* (2013.01); *G09G 2370/022* (2013.01)

(58) Field of Classification Search
CPC ... G06F 3/1446; G06F 1/1616; G06F 1/1641; G06F 1/1677; H04L 67/109; H04L 65/602; H04L 65/607; H04L 65/80; G09G 5/12; G09G 2300/026; G09G 2356/00; G09G 2370/022; H04N 21/4122; H04N 21/4307
USPC .......................................................... 725/74
See application file for complete search history.

(56) References Cited

U.S. PATENT DOCUMENTS

| | | | | |
|---|---|---|---|---|
| 2008/0155085 | A1* | 6/2008 | Yokoyama et al. | 709/223 |
| 2009/0237325 | A1* | 9/2009 | Luo et al. | 345/2.1 |
| 2009/0237560 | A1* | 9/2009 | Ganzaroli et al. | 348/511 |
| 2012/0185693 | A1* | 7/2012 | Chen et al. | 713/168 |

\* cited by examiner

*Primary Examiner* — Benjamin R Bruckart
*Assistant Examiner* — Susan X Li
(74) *Attorney, Agent, or Firm* — Sherman IP LLP; Kenneth L. Sherman; Hemavathy Perumal

(57) ABSTRACT

A method for content rendering in a clustered display network. The method includes assigning a role to each of multiple client display devices by a distributing display device. A rendering responsibility for each of the client display devices is assigned by the distributing display device. Received content is fed, by the distributing display device, to one or more display groups each including at least a portion of the client display devices.

29 Claims, 21 Drawing Sheets

| Syntax | No. of bits | Mnemonic |
|---|---|---|
| transport_packet(){ | | |
|   sync_byte | 8 | bslbf |
|   transport_error_indicator | 1 | bslbf |
|   payload_unit_start_indicator | 1 | bslbf |
|   transport_priority | 1 | bslbf |
|   PID | 13 | uimsbf |
|   transport_scrambling_control | 2 | bslbf |
|   adaptation_field_control | 2 | bslbf |
|   continuity_counter | 4 | uimsbf |
|   if(adaptation_field_control?? '10'|| adatation_field_control ?? '11'){ | | |
|     adaptation_field() | | |
|   } | | |
|   if(adaptation_field_control ?? '01' || adaptation_field_control ?? '11') { | | |
|     for (i ? 0;i ? N; i ??){ | | |
|       data_byte | 8 | bslbf |
|     } | | |
|   } | | |
| } | | |

FIG. 4

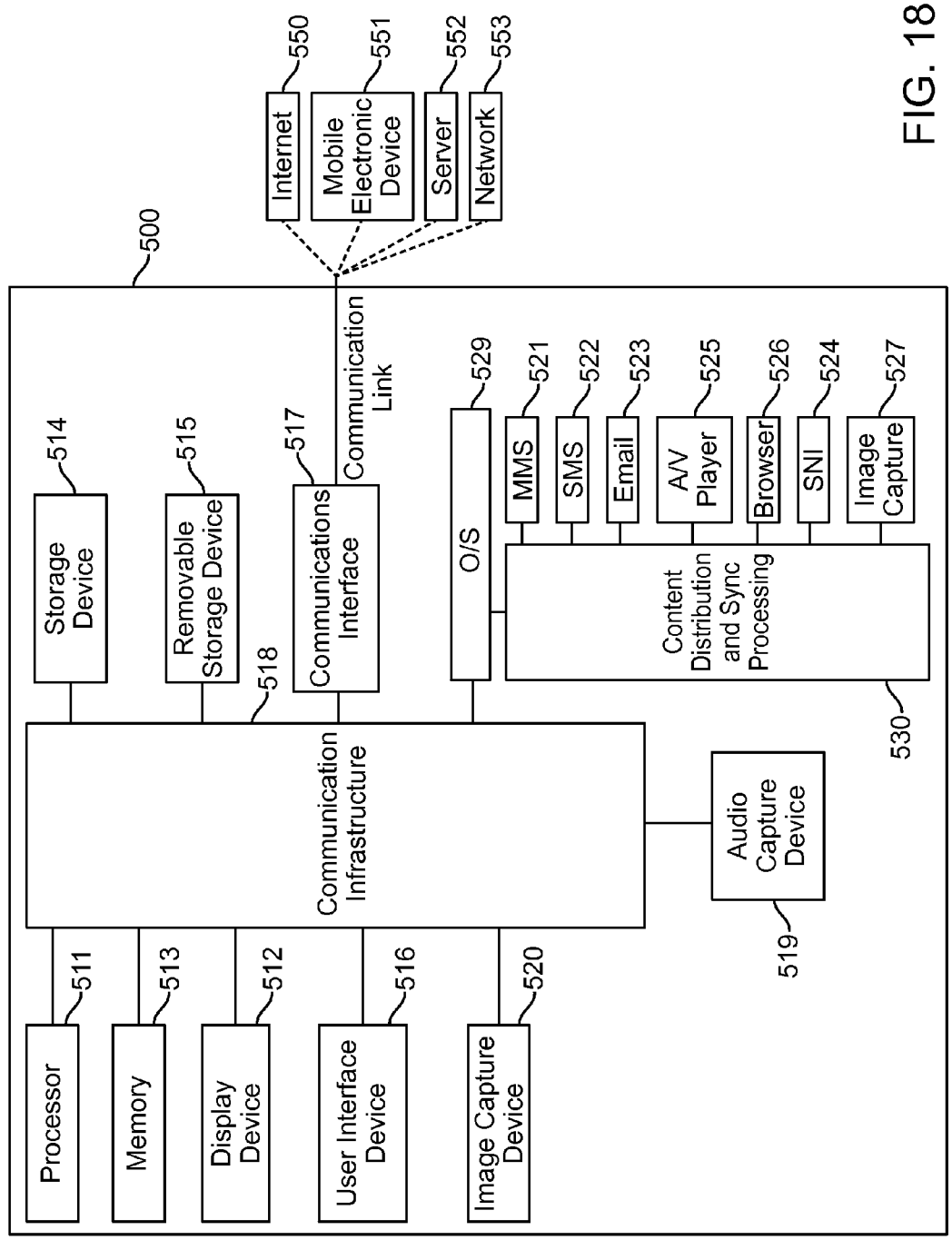

DISTRIBUTED RENDERING SYNCHRONIZATION CONTROL FOR DISPLAY CLUSTERING

CROSS-REFERENCE TO RELATED APPLICATIONS

This application claims the priority benefit of U.S. Provisional Patent Application Ser. No. 61/762,805, filed Feb. 8, 2013, incorporated herein by reference in its entirety.

TECHNICAL FIELD

One or more embodiments relate generally to display clustering systems and, in particular, to distributing server functionality to a smart device for distributed synchronization control and display clustering.

BACKGROUND

Display clustering systems have distribution processing performed by a display clustering server and the client display devices used, act as "dumb" devices that just display what is received.

SUMMARY

In one embodiment, a method provides for content rendering in a clustered display network. In one embodiment, the method includes assigning a role to each of a plurality of client display devices by a distributing display device. In one embodiment, a rendering responsibility for each of the client display devices is assigned by the distributing display device. In one embodiment, received content is fed, by the distributing display device, to one or more display groups each including at least a portion of the plurality of client display devices.

One embodiment provides a system for content rendering. The system includes a plurality of electronic display devices, and one or more content sources. In one embodiment, a particular one of the plurality of electronic display devices is assigned a role of a distributing display device, and remaining electronic display devices comprise client display devices. In one embodiment, the distributing display device assigns roles to the client display devices, configures a rendering responsibility for each of the client display devices, and feeds content received from the one or more content sources to one or more display groups each comprising at least a portion of the client display devices.

Another embodiment provides a non-transitory computer-readable medium having instructions which when executed on a computer perform a method comprising: assigning a role to each of a plurality of client display devices by a distributing display device. In one embodiment, a rendering responsibility for each of the plurality of client display devices is configured by the distributing display device. In one embodiment, received content is fed, by the distributing display device, to one or more display groups each comprising at least a portion of the plurality of client display devices.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 4 illustrates an example structure of a transport stream packet header, according to one embodiment.

FIG. 18 is a high-level block diagram showing an information processing system comprising a computing system implementing an embodiment.

DETAILED DESCRIPTION

Figure 1:
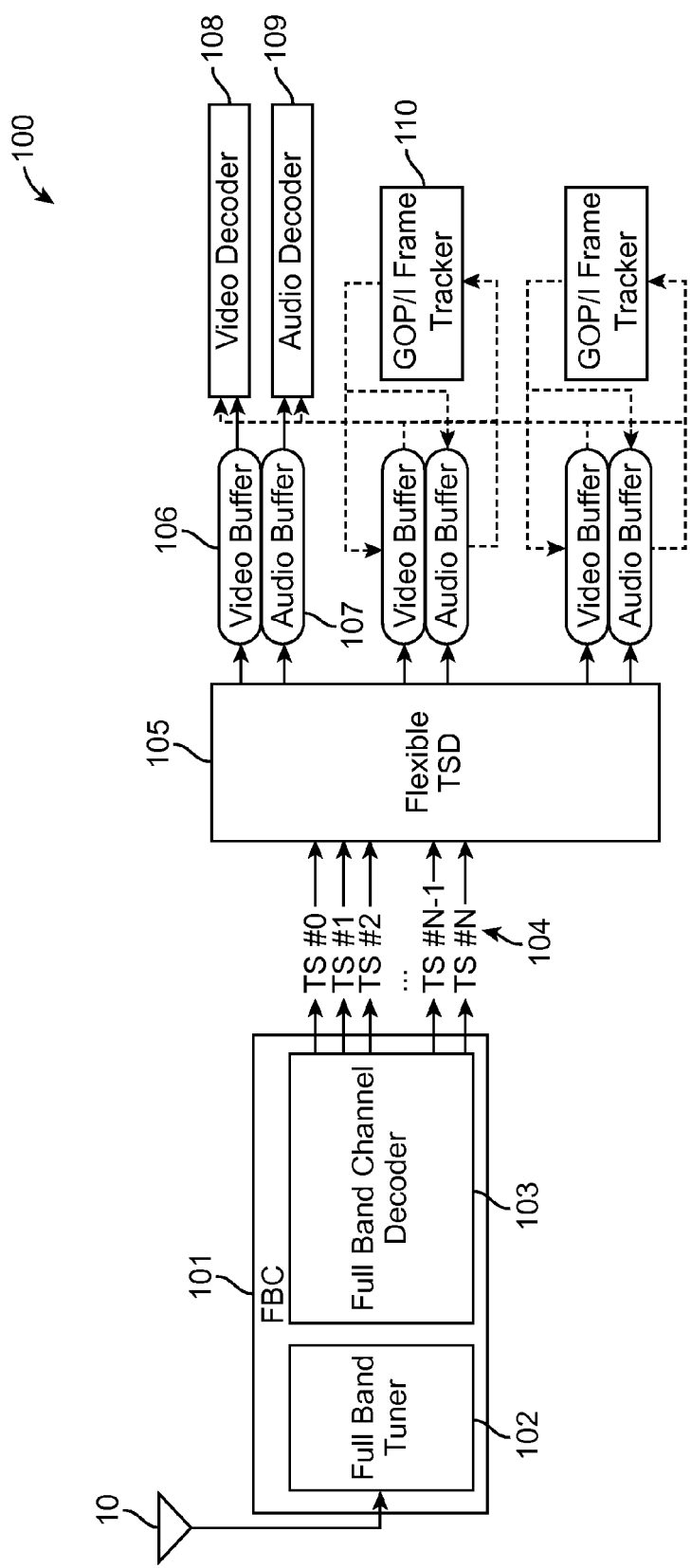
FIG. 1 is a high-level block diagram showing an overall system architecture, according to one embodiment.

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to distributed synchronization control and display clustering. In one embodiment, a method for content rendering in a clustered display network includes assigning a role to each of a plurality of client display devices by a distributing display device. In one embodiment, a rendering responsibility for each of the client display devices is assigned by the distributing display device. In one embodiment, received content is fed, by the distributing display device, to one or more display groups each including at least a portion of the plurality of client display devices.

In one embodiment, a system includes a plurality of electronic display devices, and one or more content sources. In one embodiment, a particular one of the plurality of electronic display devices is assigned a role of a distributing display device, and remaining electronic display devices comprise client display devices. In one embodiment, the distributing display device assigns roles to the client display devices, configures a rendering responsibility for each of the client display devices, and feeds content received from the one or more content sources to one or more display groups each comprising at least a portion of the client display devices.

In one embodiment, the display devices comprise electronic devices, which may include television devices, smart television devices, mobile television devices, devices capable of data communication over a communication link such as a wireless communication link, mobile computing devices, etc. In one embodiment, a mobile device includes a mobile phone or smart phone device, a mobile tablet device, a wearable device, a mobile computing device, etc.

One or more embodiments include a method and system for fast channel zapping with I/GOP frame tracking for multi-transport stream acquisition are disclosed herein. One or more embodiments relate generally to digital televisions, and, in particular, to digital television (DTV) and set-top box (STB) systems having improved channel changing ("surfing", "zapping", etc.) capabilities.

Digital cable and digital satellite television viewers know how slow it can be to change channels. With analog receivers, "channel surfing" quickly by repeatedly pressing the "Channel Up" or "Channel Down" button on a remote control is possible. With digital systems, one cannot channel surf without experiencing significant delays between channels and/or broken images that take a second or so to rectify after changing channels. These problems can seriously detract from the user experience.

The reason digital television channel surfing experiences significant delays is related to how digital images are formed and transmitted. While both analog and digital televisions operate by tuning and demodulating incoming radio frequency (RF) signals, a particular RF signal is associated with only one channel for analog television. However, in digital television, each RF signal can contain several "channels," better thought of as program streams, of information. Thus, with digital television a single tuner can tune a single frequency and receive multiple program streams. Those program streams are embedded in a Motion Pictures Expert Group (MPEG) transport stream. It is left to the remainder of the digital receiver to isolate the desired program stream and then display that content.

The MPEG encoding format uses three types of video frames, which are identified as "I", "P", and "B". An "I" frame represents a complete full-screen image. A "P" frame contains just the changes that need to be made to a previous "I" frame or "P" frame. By sending only the changes from a previous frame instead of the entire image, far less image data needs to be sent. A "B" frame is similar to a "P" frame except that it describes changes from a previous and/or a following "I" or "P" frame. It should be understood that to use a "B" frame, a subsequent "I" or "P" frame may be required. To produce continuous content, the image frames are buffered to form a Group of Pictures (GOP), which represent all of the image frames from one "I" frame to the next. An example of a GOP is the set IBBBPBBBPBBBP.

To present a complete image, an "I" frame must be available. In fact, all "P" and "B" frames are usually discarded until the first "I" frame is received. Once an "I" frame arrives, the program's video frames can be composed and displayed. Typically, an "I" frame arrives once about a second or so, but with highly compressed video data, an "I" frame may come less frequently, perhaps once about every three seconds or so. The fact that an "I" frame is required after changing a channel is a major cause of the problems with channel surfing. To speed up channel changing, some digital systems do not wait for an "I" frame and proceed by using a "P" frame. This is what causes broken images to appear since not all of the image data is available.

Embodiments of the invention disclosed herein provide a method and system for fast channel zapping with I/GOP frame tracking for multi-transport stream acquisition.

In one embodiment of the present invention, by capturing and accumulating a plurality of MPEG transport streams and checking the reference frame picture position in the background, a user can change from one channel to another channel and a transport stream decoder can start without waiting for the reference frame because the stream has already digested by I/GOP frame tracker, and the read pointer from the accumulated transport stream buffer has changed to an appropriate position. In one embodiment, with the background operation, it can reduce the reference frame waiting time to see the first picture on the television screen after changing channels by at least about 0.5 seconds against current digital television systems.

FIG. 1 is a high-level block diagram showing an overall system architecture comprising a system 100 implementing an embodiment of the present invention. The system 100 comprises an antenna 10, a full band capture (FBC) tuner module 101, a flexible transport stream decoder (TSD) 105, a plurality of video buffers 106, a plurality of audio buffers 107, a video decoder 108, an audio decoder 109, and a plurality of GOP/I frame trackers 110 (or "I/GOP frame trackers"). The FBC tuner module 101 comprises a full band tuner 102 and a full band channel decoder 103. The full band channel decoder 103 provides N transport streams 104, wherein N is an integer greater than or equal to zero, from the full band channel decoder 103 in the FBC tuner module 101 to the flexible TSD 105. The flexible TSD 105 demultiplexes the transport streams 104, packetizes the transport streams into a plurality audio, video, and other meta data packets 60, 20 (FIG. 6, FIG. 2A, respectively), and writes the audio and video data packets 60, 20 into the audio and video buffers 106, 107.

In this embodiment, two sets of an audio and a video buffer coupled together are further coupled to two GOP/I frame trackers 110 for the background processing of audio and video data packets 60, 20. In one embodiment, one set may be dedicated for a predicted Up Channel and the other set may be dedicated for a predicted Down Channel.

In one embodiment, the system 100 does not use multiple baseband tuners. In one embodiment, in utilizing the FBC tuner module 101, multiple baseband transport streams 104 can be captured with the full band tuner 102 and provided to a full band channel decoder 103, providing at the same time multiple transport streams 104 to the flexible TSD 105. In one embodiment, the flexible TSD 105 is not directly connected to or aligned with only a baseband capture tuner. In one embodiment, the flexible TSD 105 is not directly connected to or aligned with multiple tuners that can handle only single baseband transport streams.

In one embodiment, in order to handle multiple transport streams, the system 100 uses only one flexible TSD 105 and does not use multiple transport stream decoders. In one embodiment, the system 100 does not use an audio/video decoder. In one embodiment, audio/video buffers are continuously filled in the background. In one embodiment, the GOP/I frame tracker 110, which can be a hardware or software module, can modify a video read buffer pointer 201 (FIG. 2A) of a video buffer 106. In one embodiment, the GOP/I frame tracker 110 reuses A/V buffer and does not require additional buffers, wherein the I/GOP frame tracker 110 is solely accessing the existing A/V buffer and changing the A/V read pointer.

In one embodiment, the I/GOP frame tracker 110 does not necessarily control the A/V decoders 108, 109. In one embodiment, the GOP/I frame tracker 110, which can be a hardware or software module, can modify an audio read buffer pointer 601 (FIG. 6) of an audio buffer 107. In order to support the GOP/I frame tracker 110, the video buffers 106 may comprise an extra dedicated read pointer, which will be discussed in detail below.

Figure 2A:
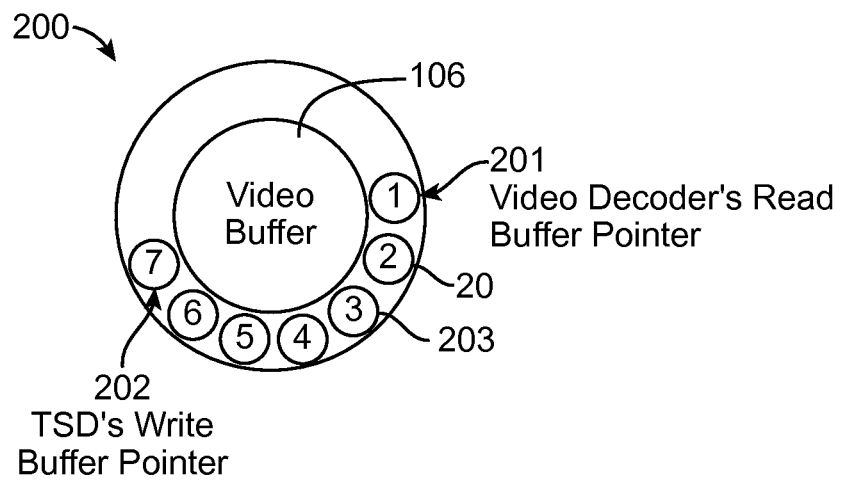
FIG. 2A illustrates a schematic representation of a mechanism for managing video buffers, according to one embodiment.

FIG. 2A illustrates a schematic representation of a mechanism 200 for managing video buffers 106, which demonstrates aspects of the implementation according to one embodiment. The mechanism 200 comprises the video buffer 106 receiving a plurality of video data packets 20 from the flexible TSD 105 ordered numerically in a circular queue 203. As the plurality of video data packets 20 are written into the queue 203, a video write buffer pointer 202 points to a video data packet 20 currently being written into the queue 203 by the TSD 105. As the plurality of video data packets 20 are written into the queue 203, a video read buffer pointer 201 points to a video data packet 20 currently being read from the queue 203 by the video decoder 108. From the video decoder 108 perspective, the video decoder 108 uses the video read buffer pointer 201 as a reference point to start decoding the video data packet 20 to which the video read buffer pointer 201 refers.

In one embodiment, the flexible TSD 105 and the video decoder 108 have the ability to change/modify the amount of video data packets 20 are in between the video read/write buffer pointers 201, 202. In one embodiment, the flexible TSD 105 controls the video write buffer pointer 202 and the video decoder 108 controls the video read buffer pointer 201.

Figure 2B:
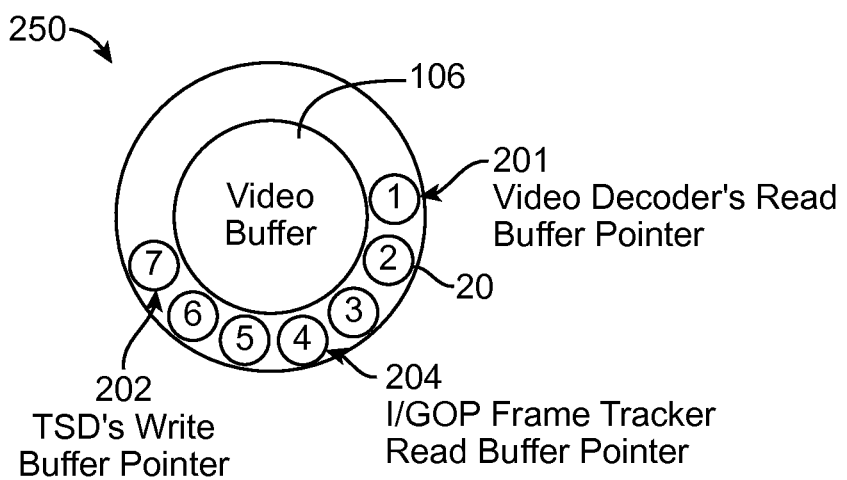
FIG. 2B illustrates another schematic representation of a mechanism for managing video buffers, according to one embodiment.

FIG. 2B illustrates another schematic representation of a mechanism 250 for managing video buffers 106 similar to the mechanism 200 shown in FIG. 2A, according to one embodiment. The mechanism 250 comprises the video buffer 106 receiving a plurality of video data packets 20 from the flexible TSD 105 ordered numerically in a circular queue 203. As the plurality of video data packets 20 are written into the queue 203, a video write buffer pointer 202 points to a video data packet 20 currently being written into the queue 203 by the flexible TSD 105. As the plurality of video data packets 20 are written into the queue 203, a video read buffer pointer 201 points to a video data packet 20 currently being read from the queue 203 by the video decoder 108. As the plurality of video data packets 20 are written into the queue 203, a video read buffer pointer 201 points to a video data packet 20 currently being read from the queue 203 by the I/GOP frame tracker 110. From the video decoder 108 perspective, the video decoder 108 uses the video read buffer pointer 201 as a reference point to start decoding the video data packet 20 to which the video read buffer pointer 201 refers.

In one embodiment, the I/GOP frame tracker 110 or any other software module may have the ability to change/modify the position of the video read buffer pointer 201. In one embodiment, the flexible TSD 105 controls the video write buffer pointer 202, the video decoder 108 controls the video read buffer pointer 201, and the I/GOP frame tracker 110 controls the video read buffer pointer 201.

In one embodiment, the I/GOP frame tracker 110 may be implemented in the form of a software or a hardware module and comprises four functionalities when managing video buffers 106:
(1) event receiving functionality,
(2) data read functionality from video buffer,
(3) packet parsing to find a I/GOP frame packet, and
(4) video decoder's read buffer pointer 201 modification functionality.

Multimedia data formats inside the video buffer 106 may vary depending on the system design, but two typical designs are as follows: (1) Among the combined transport packets, the flexible TSD 105 extracts only video transport stream packets and stores the extraction on the video buffer 106. (2) Among the combined transport packets, the flexible TSD 105 extracts only video transport stream packets, opens the packs to extract packetized elementary stream (PES) data and stores the extraction on the video buffer 106.

Figure 3A:
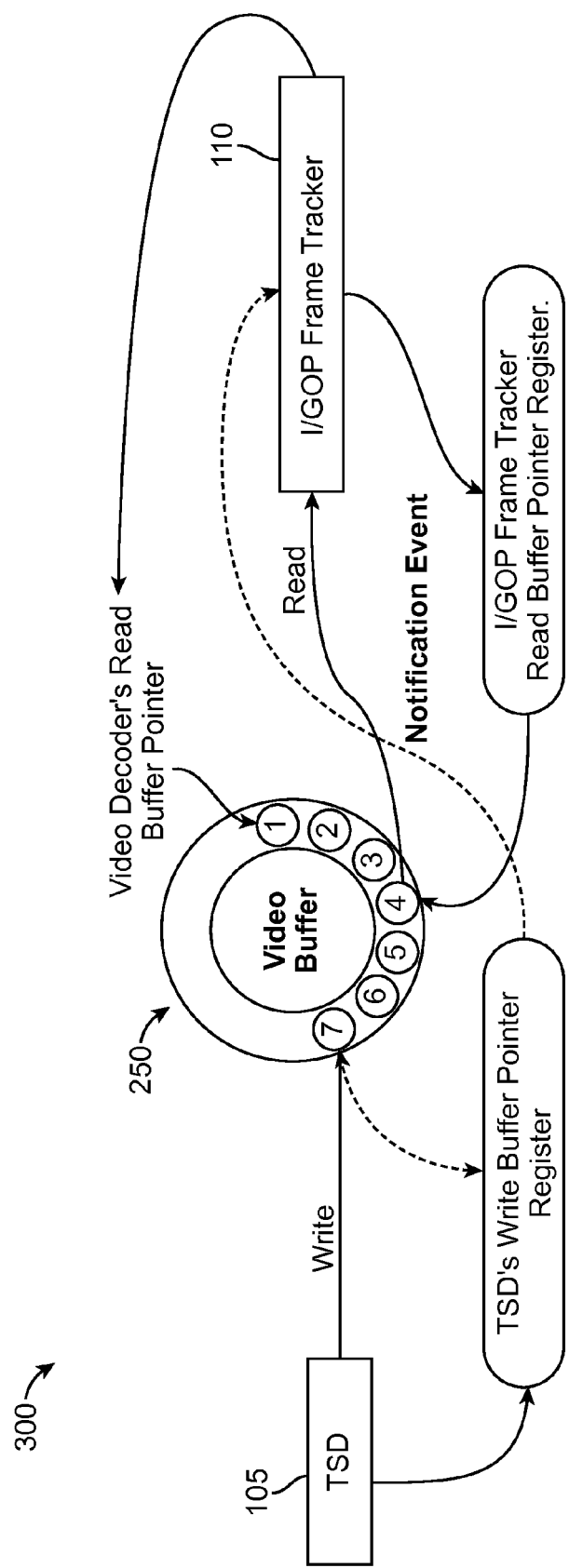
FIG. 3A illustrates a schematic representation of a mechanism for implementing an I frame Group of Pictures (I/GOP) frame tracker, according to one embodiment.

FIG. 3A illustrates a schematic representation of a mechanism 300 for implementing an I frame Group of Pictures (I/GOP) frame tracker 110, according to one embodiment. In order for the I/GOP frame tracker 110 to operate properly, an event source is required from the flexible TSD 105. After the flexible TSD 105 has completed writing a video data packet 20 into the video buffer 106, the flexible TSD 105 stores the video write buffer pointer 202 information into a TSD write buffer pointer register and generates and sends a notification event to the I/GOP frame tracker 110. In order to minimize the number of events and reduce the system overhead to process the events, TSD 105 functionality may be extended to parse transport stream headers to detect payload unit start indicator (PUSI) flags and to generate an event in case of a PUSI flag having a "1" value. Even though the TSD 105 has an ability to generate a notification by checking PUSI flags, the TSD 105 needs to generate an event for every transport stream packet writing operation to video buffer 106 in order to generate a packet arrival frequency/histogram after accumulating events and can be used for each transport packet parsing if no PUSI flag detector exists inside TSD 105

Figure 3B:
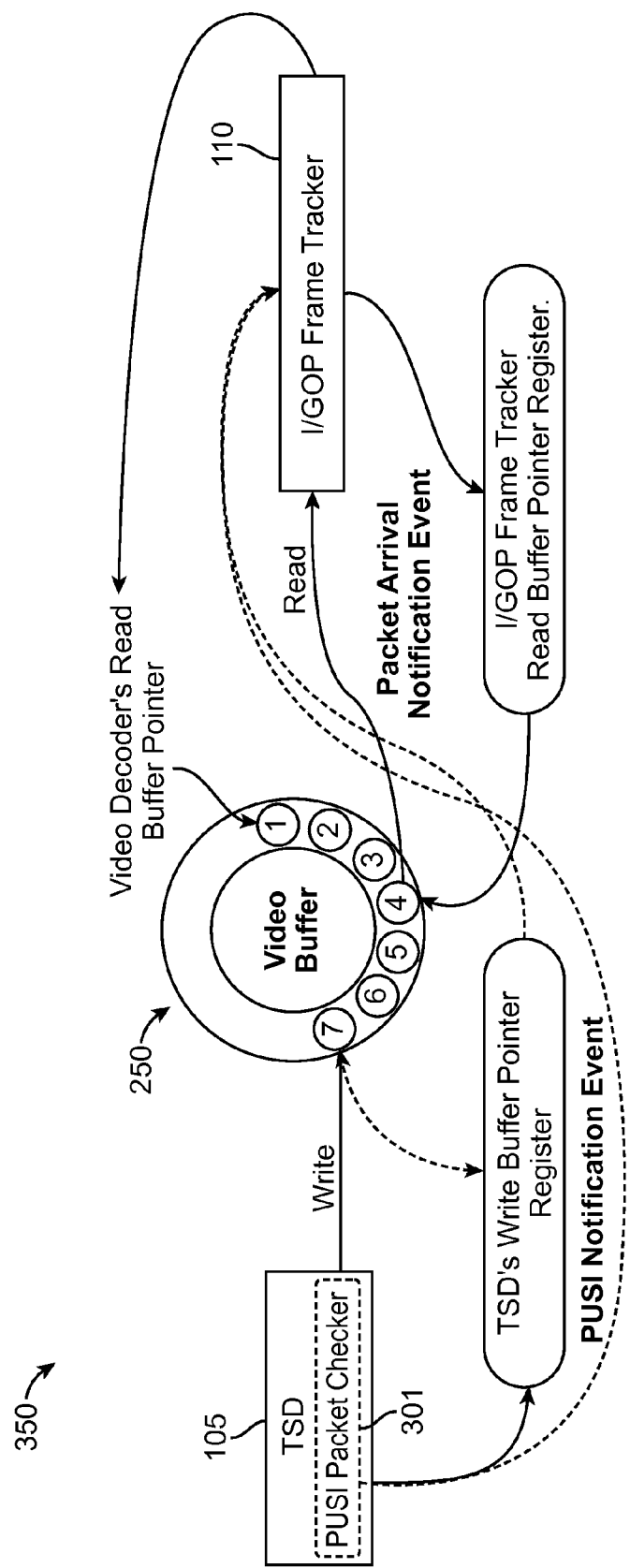
FIG. 3B illustrates another schematic representation of a mechanism for implementing the I/GOP frame tracker, according to one embodiment.

FIG. 3B illustrates another schematic representation of a mechanism 350 for implementing the I/GOP frame tracker 110, according to one embodiment. In one embodiment of the flexible TSD 105 comprises a PUSI packet checker 301. There are other available events from TSD 105, such as an event after TSD 105 wrote a video data packet 20 to video buffer 106 based on memory writing units (e.g., Jules), but because the I/GOP frame tracker 110 works based on the size of the transport stream packet 20, it may be efficient to generate an event either after TSD 105 writes a transport stream packet 20 to the video buffer 106 or after the PUSI packet checker 301 detects a PUSI packet by scanning transport stream packets 20 before writing the transport stream packet 20 to the video buffer 106. If the I/GOP frame tracker 110 is implemented via a software module, a PUSI interruption event signal will be routed to the software, and if the I/GOP frame tracker is implemented via a hardware module, a PUSI interruption event signal will be directly routed to the hardware component via electrical signal.

In one embodiment of the invention, the I/GOP frame tracker 110 will decide a data size to read after checking both the video read buffer pointer 201 and the video write buffer pointer 202. After deciding a data size to read, the data operation can proceed with word, byte size and may or may not be performed after reading the entire data.

In one embodiment of the invention, if the data type inside the video buffer 106 is transport stream, then the I/GOP frame tracker 110 can determine whether a packet is a I/GOP frame or not due to the pre-defined transport packet size, wherein processing header information from transport stream packets is required. Once the processing operation has finished and if the I/GOP frame tracker 110 finds a PUSI packet, it will begin parsing the next payload. Otherwise, it will wait for the next packet arrival signal.

FIG. 4 illustrates an example structure of a transport stream packet header, according to one embodiment. In one embodiment of the invention, if the data type in the video buffer 106 is PES video data, wherein the data is encapsulated with a transport stream packet, the I/GOP frame tracker 110 can determine whether the frame is a I/GOP video frame by implementing a frame parsing operation based on the PUSI packet interruption signal received from the TSD 105 as a PUSI notice.

Figure 5:
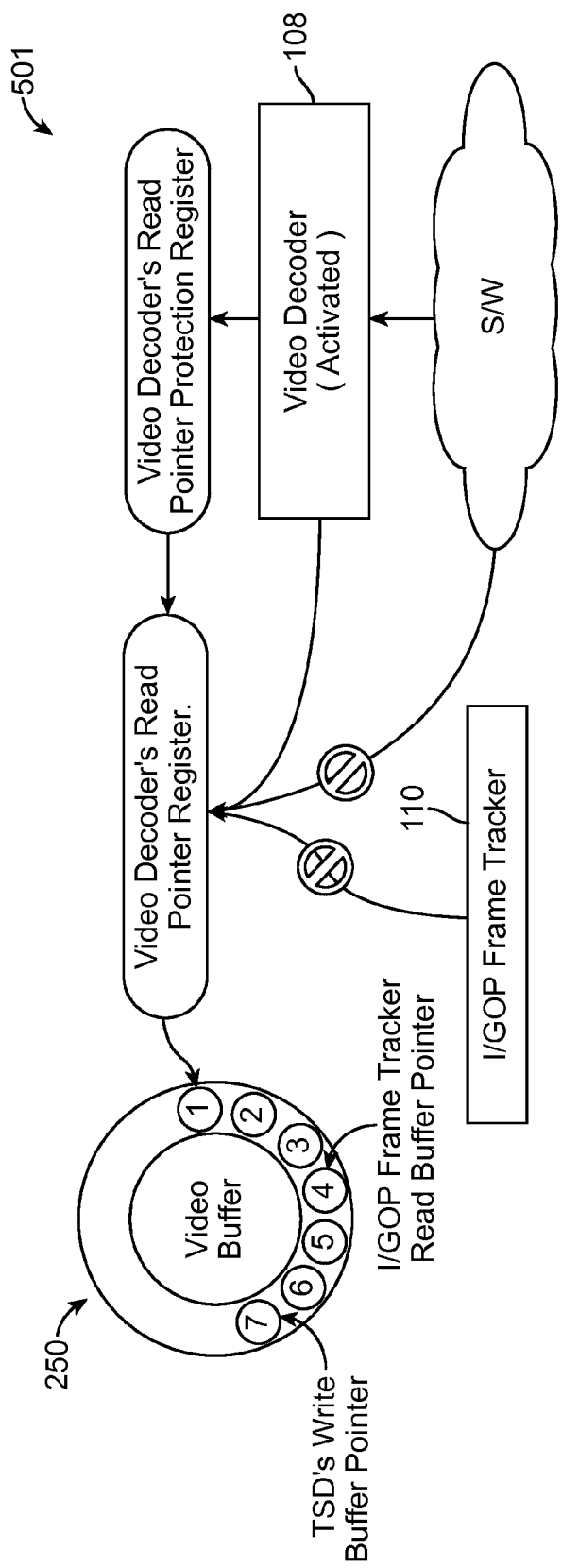
FIG. 5 illustrates a schematic of a mechanism for a video decoder's write pointer protection, according to one embodiment.

FIG. 5 illustrates a schematic of a mechanism 501 for a video decoder's write pointer protection, according to one embodiment. By changing the position of the video decoder read pointer 201 after scanning the video buffer 106 in the background with the I/GOP frame tracker 110 and activating the video decoder 108, the time delay to arrive at the first I/GOP video frame can be eliminated or significantly reduced. After the video decoder 108 begins consuming video packets, the video decoder's read pointer may be modified by only video decoder 108, wherein the I/GOP frame tracker 110 or any other software module cannot access or modify the video decoder's read pointer register.

Figure 6:
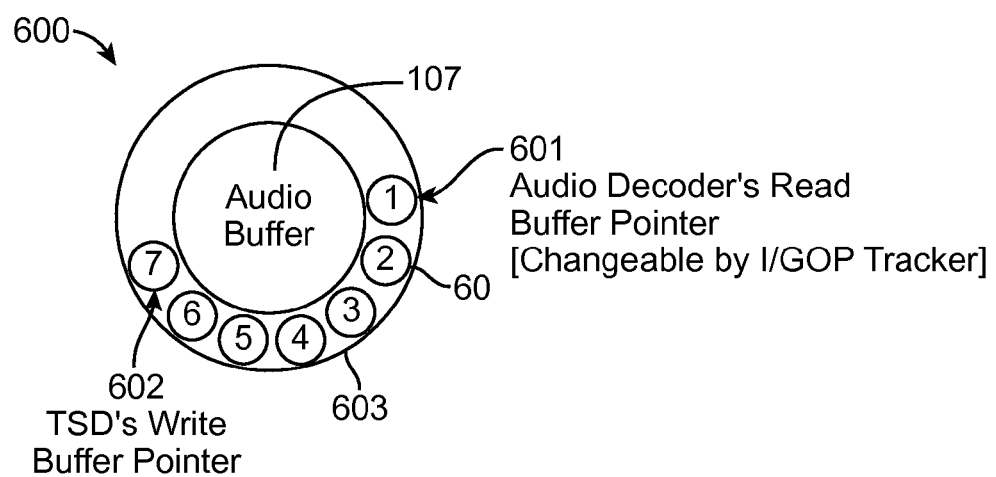
FIG. 6 illustrates a schematic of a mechanism for modifying an audio decoder's buffer read pointer, according to one embodiment.

FIG. 6 illustrates a schematic of a mechanism 600 for modifying an audio decoder's buffer read pointer 601, according to one embodiment. The mechanism 600 comprises the audio buffer 107 receiving a plurality of data packets 60 from the flexible TSD 105 ordered numerically in a circular queue 603. As the plurality of audio data packets 60 are written into the queue 603, an audio write buffer pointer 602 points to an audio data packet 60 currently written into the queue 603 by the TSD 105. As the plurality of audio data packets 60 are written into the queue 603, an audio read buffer pointer 601 points to an audio data packet 60 currently being read from the queue 603 by the audio decoder 109. From the audio decoder 109 perspective, the audio decoder 109 uses the read buffer pointer 601 as a reference point to start decoding the audio data packet 60 to which the audio read buffer pointer 601 refers. In one embodiment, the audio decoder 109 and the I/GOP frame tracker 110 have the authority to change or modify the audio decoder's read buffer pointer 601 in alignment with the I/GOP video frame.

Figure 7A:
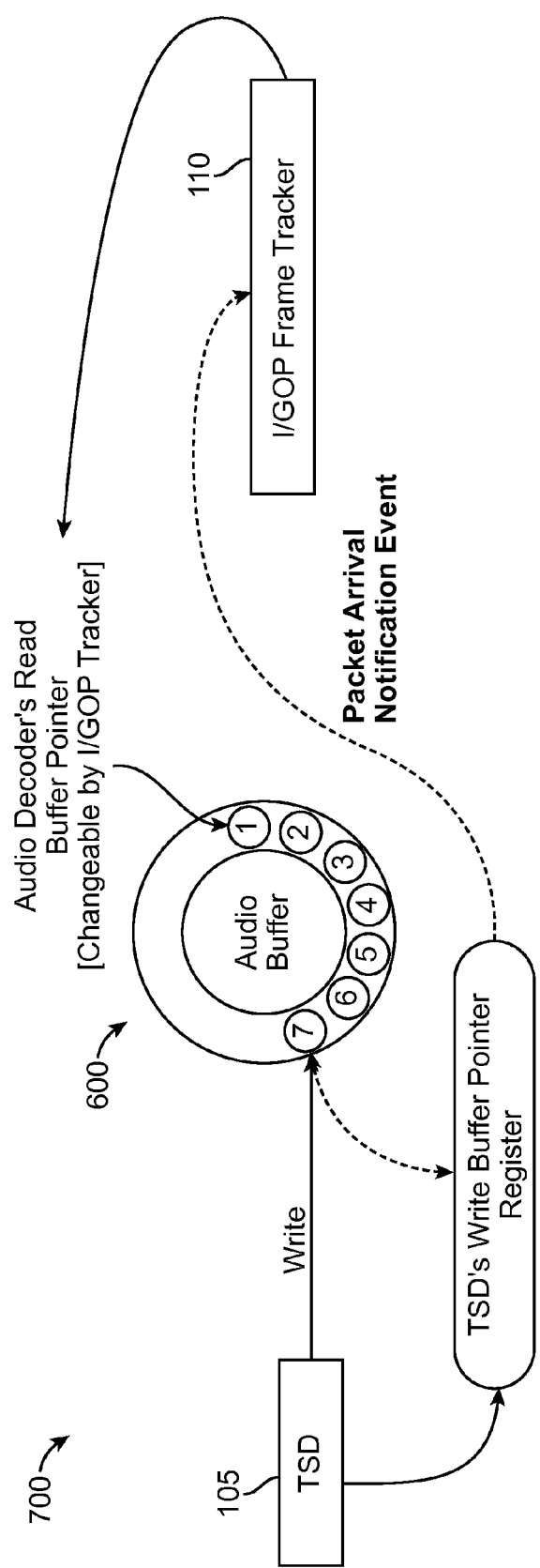
FIG. 7A illustrates a schematic of a mechanism for measuring the frequency of audio packet arrivals in the audio buffer, according to one embodiment.

FIG. 7A illustrates a schematic of a mechanism 700 for measuring the frequency of audio packet arrivals 60 in the audio buffer 107, according to one embodiment. Before changing the audio decoder's read buffer pointer 601, the I/GOP frame tracker 110 determines the starting position of a proper audio packet, which requires calculating the frequency of audio packet arrivals.

Figure 7B:
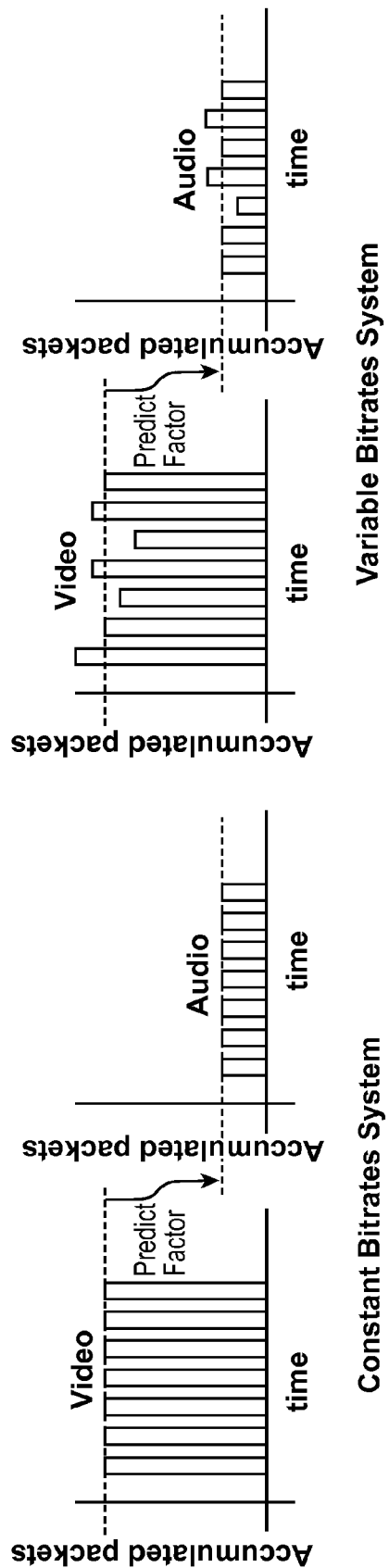
FIG. 7B illustrates example histograms of the frequency of accumulated audio and video packets of broadcast systems employing constant bitrates and variable bitrates over time.

FIG. 7B illustrates example histograms of the frequency of accumulated audio and video packets 60, 20 of broadcast systems employing constant bitrates and variable bitrates over time. By accumulating packet arrival notifications from the TSD 105, the I/GOP frame tracker 110 generates an average value of the audio/video packets 60 arriving in the audio buffer 107. Based on the results, the I/GOP frame tracker 110 estimates an appropriate audio packet position, wherein the audio packet position is aligned with the I/GOP position in the video buffer 106.

Figure 7C:
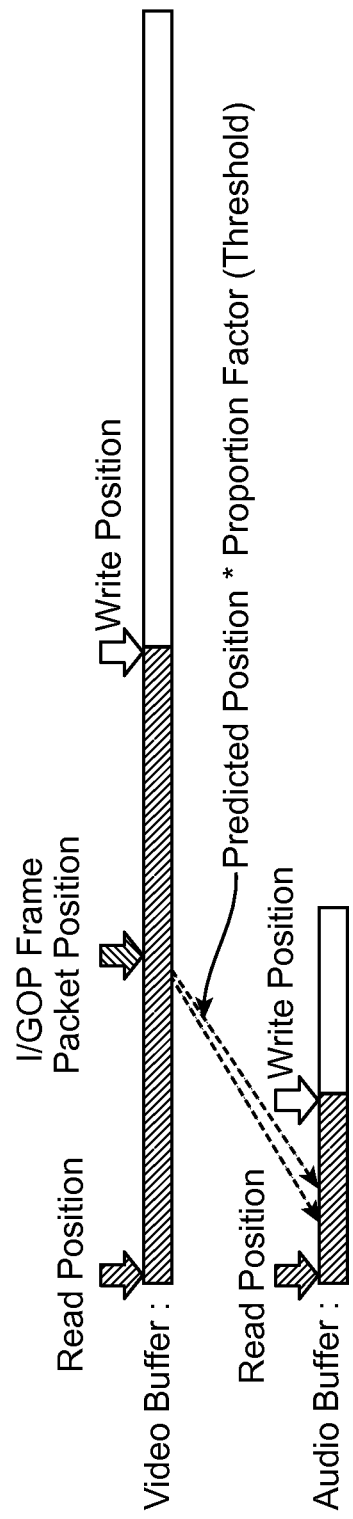
FIG. 7C illustrates an example schematic estimation for an audio packet position based on a proportion factor determined from experience, field status, and other heuristic data, according to one embodiment.

FIG. 7C illustrates an example schematic estimation for an audio packet position based on a proportion factor determined from experience, field status, and other heuristic data, according to one embodiment. As the audio buffer's read buffer pointer 601 is modified by mechanism 700 and the audio decoder 109 begins decoding/consuming audio data packets 60, the video buffer's write protection mechanism is active. The estimation may be implemented in a plurality of ways (e.g., a hardware block with microcode, a Linux kernel module, platform software, middleware layer, etc.).

Figure 8:
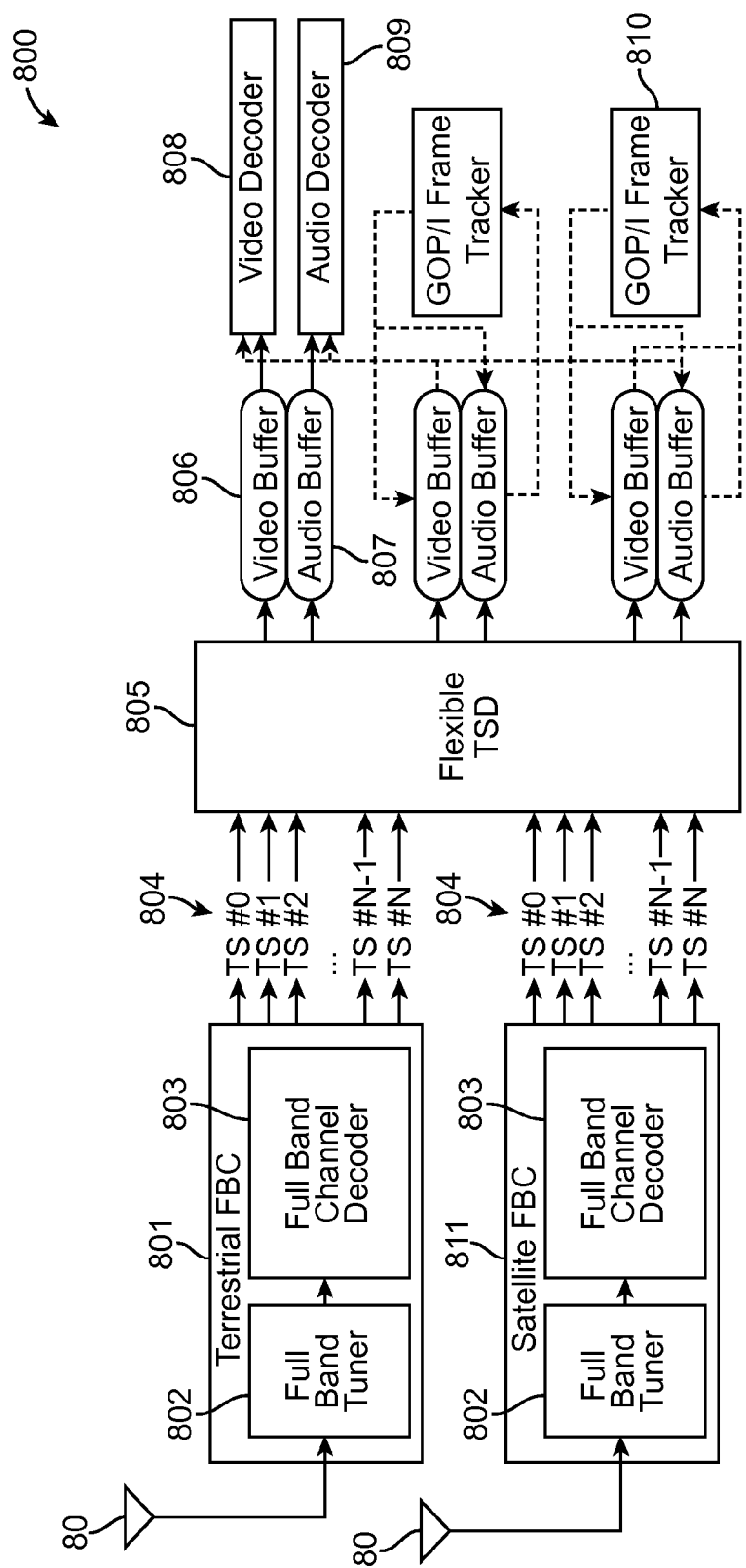
FIG. 8 is a high-level block diagram showing an overall system architecture, according to one embodiment.

FIG. 8 is a high-level block diagram showing an overall system 800 architecture, according to one embodiment. The system 800 comprises a full band capture (FBC) terrestrial tuner module 801, a full band capture (FBC) satellite tuner module 811, multiple antennas 80 (an antenna for each tuner module), a flexible transport stream decoder (TSD) 805, a plurality of video buffers 806, a plurality of audio buffers 807, a video decoder 808, an audio decoder 809, and a plurality of GOP/I frame trackers 810. The FBC terrestrial and satellite tuner modules 801, 811 comprise a full band tuner 802 and a full band channel decoder 803. Each full band channel decoder 803 may provide up to N transport streams 804, wherein N is an integer greater than or equal to zero, from each full band channel decoder 803 in the FBC terrestrial and satellite tuner modules 801, 811 to the flexible TSD 805. In this embodiment, using multiple FBC for multiple standards, the invention allows simultaneous coverage over multiple standard frequency ranges and allows fast channel surfing functionality across the multiple standards.

Figure 9:
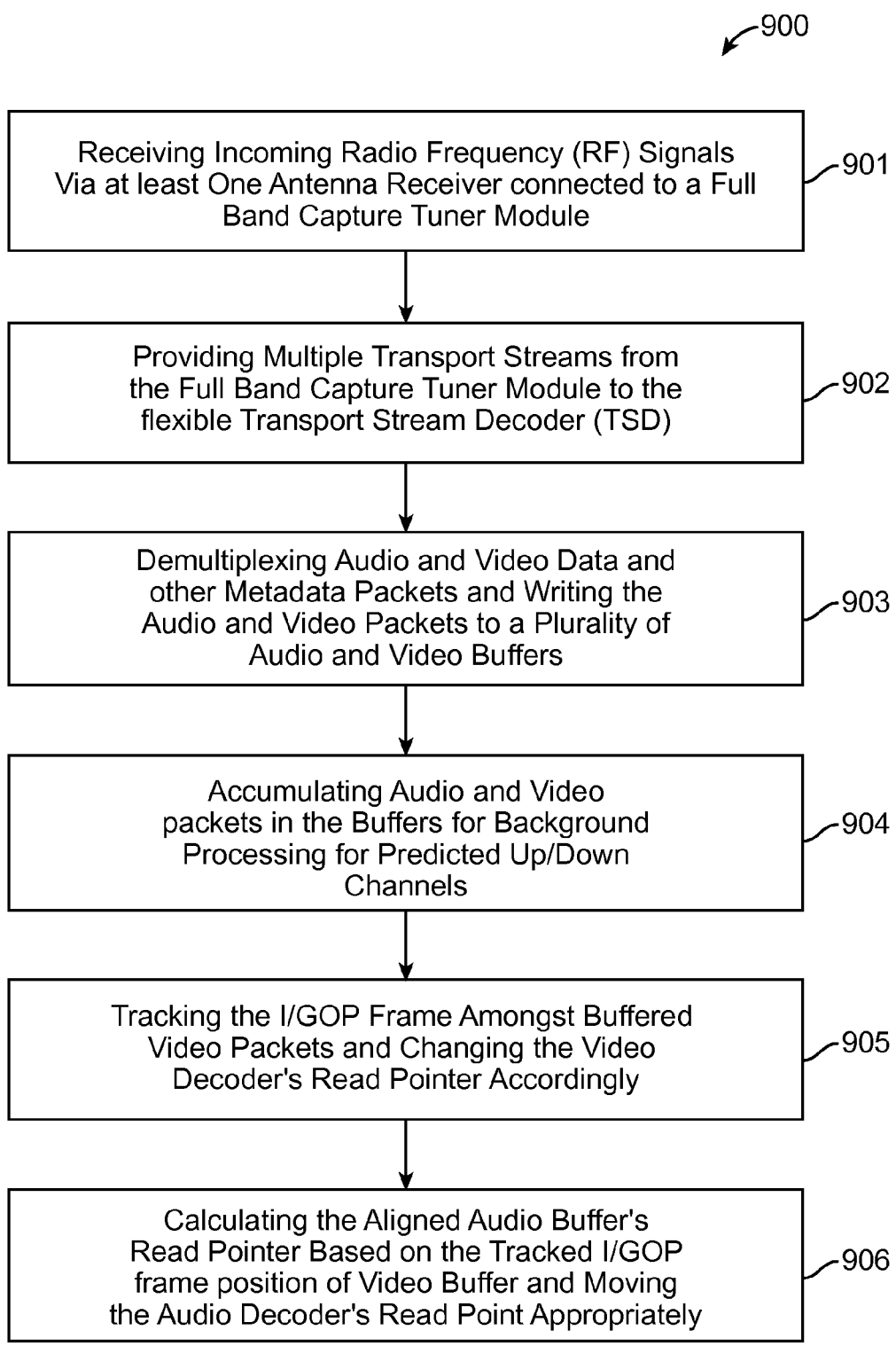
FIG. 9 shows a flowchart of a process for providing a method and system for fast channel zapping with I/GOP frame tracking for multi-transport stream acquisition, according to an embodiment.

FIG. 9 shows a flowchart of a process 900 for providing a method and system for fast channel zapping with I/GOP frame tracking for multi-transport stream acquisition, according to an embodiment. Process block 901 comprises receiving incoming radio frequency (RF) signals via at least one antenna receiver connected to a full band capture tuner module. Process block 902 comprises providing multiple transport streams from the full band capture tuner module to the flexible transport stream decoder (TSD). Process 903 comprises demultiplexing audio and video data and other metadata packets and writing the audio and video packets to a plurality of audio and video buffers. Process 904 comprises accumulating audio and video packets in the audio and video buffers for background processing for predicted Up and Down Channels. Process 905 comprises tracking the I/GOP frame amongst buffered video packets and changing the video decoder's read pointer accordingly. Process 906 comprises calculating the aligned audio buffer's read pointer based on the tracked I/GOP frame position of the video buffer and moving the audio decoder's read point accordingly.

Figure 10:
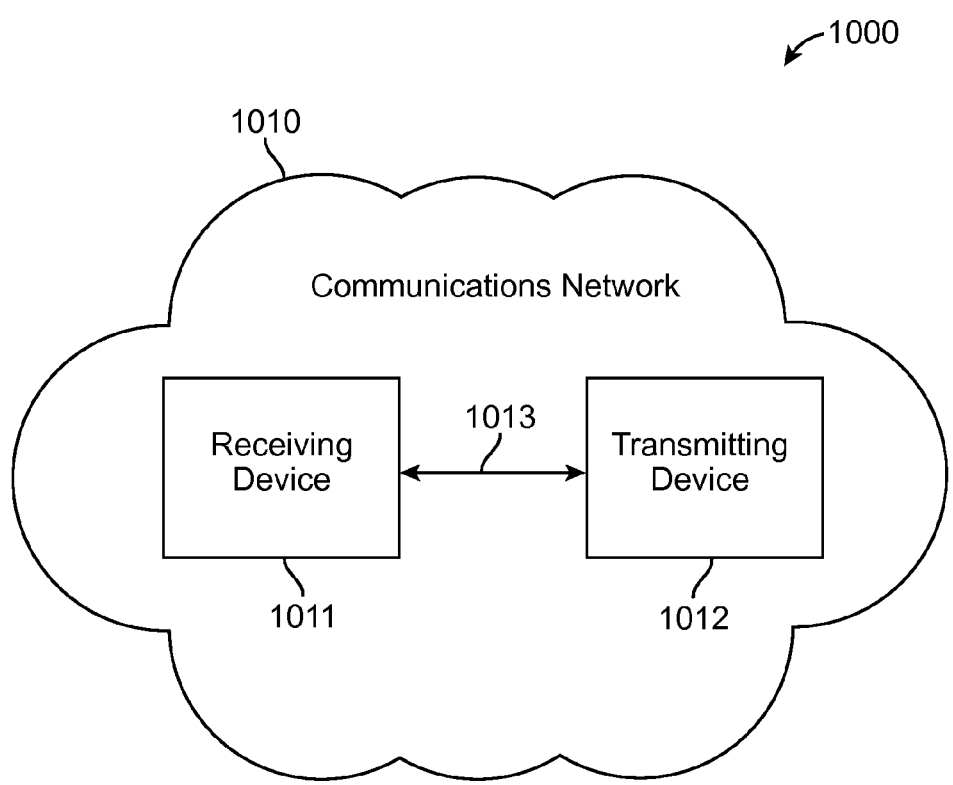
FIG. 10 is a schematic view of a communications system in accordance with one embodiment.

FIG. 10 is a schematic view of a communications system in accordance with one embodiment. Communications system 1000 may include a communications device that initiates an outgoing communications operation (transmitting/initiator device 1012) and communications network 1010, which transmitting device 1012 may use to initiate and conduct communications operations with other communications devices within communications network 1010. For example, communications system 1000 may include a communication device that receives the communications operation from the transmitting device 1012 (receiving device/listener 1011). Although communications system 1000 may include several transmitting devices 1012 and receiving devices 1011, only one of each is shown in FIG. 10 to simplify the drawing.

Any suitable circuitry, device, system or combination of these (e.g., a wireless communications infrastructure including communications towers and telecommunications servers) operative to create a communications network may be used to create communications network 1010. Communications network 1010 may be capable of providing communications using any suitable communications protocol. In some embodiments, communications network 1010 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 1010 may support protocols used by wireless and cellular phones and personal email devices (e.g., a Blackberry®). Such protocols can include, for example, GSM, GSM plus EDGE, CDMA, quad-band, and other cellular protocols. In another example, a long range communications protocol can include Wi-Fi and protocols for placing or receiving calls using VOIP or LAN. Transmitting device 1012 and receiving device 1011, when located within communications network 1010, may communicate over a bidirectional communication path such as path 1013. Both transmitting device 1012 and receiving device 1011 may be capable of initiating a communications operation and receiving an initiated communications operation.

Transmitting device 1012 and receiving device 1011 may include any suitable device for sending and receiving communications operations. For example, transmitting device 1012 and receiving device 1011 may include a media player, a cellular telephone or a landline telephone, a personal e-mail or messaging device with audio and/or video capabilities, pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences).

Figure 11:
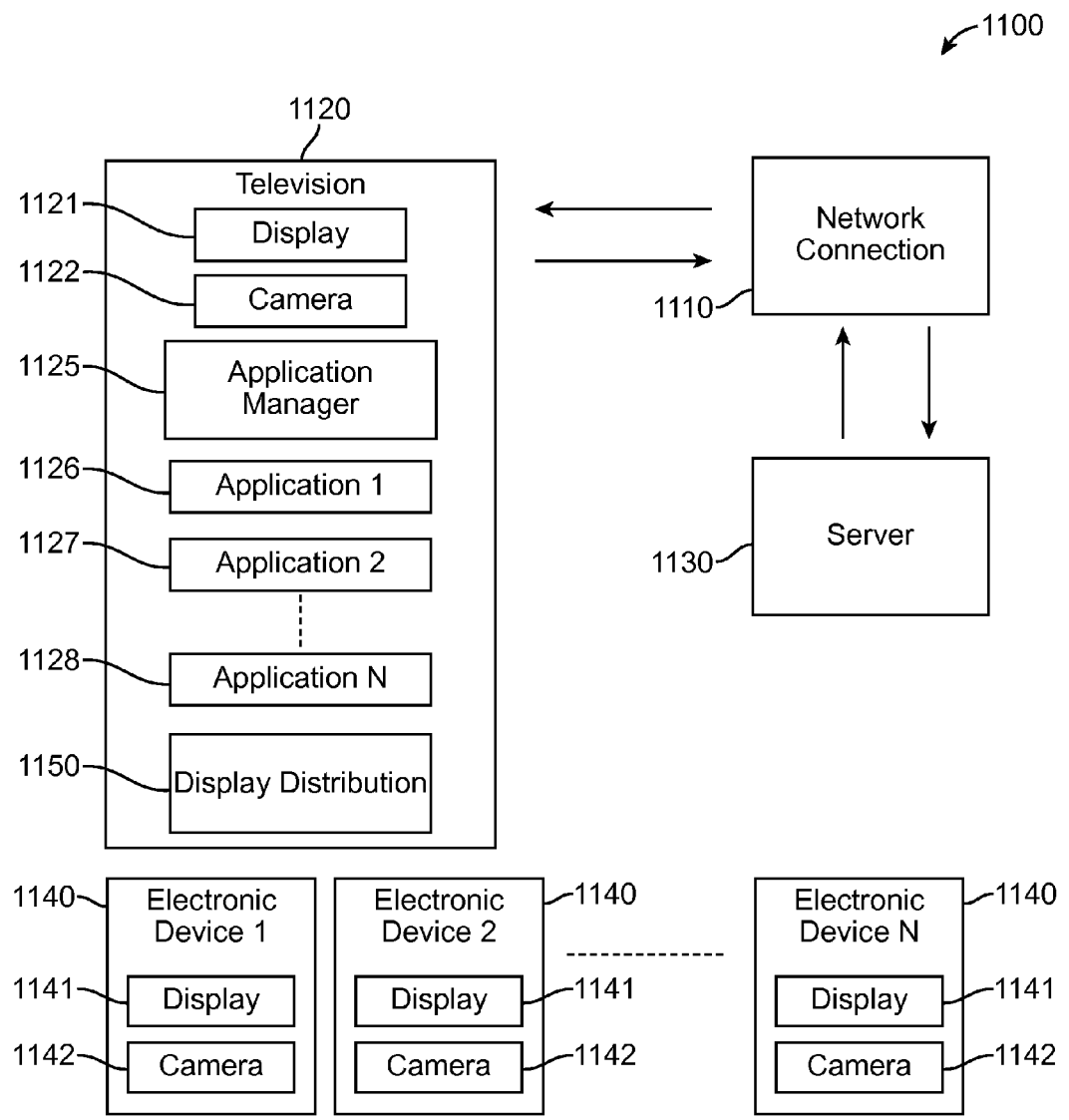
FIG. 11 shows a functional block diagram of an architecture for a system for distributed synchronization control and display clustering, according to an embodiment.

FIG. 11 shows a functional block diagram of an architecture for a system for distributed synchronization control and display clustering, according to an embodiment. In one embodiment, the system 1100 comprises a television device 1120 (e.g., a smart TV, a digital TV, a computer, tablet, etc.), a cloud or server device 1130 and network connection device 1110. In one embodiment, the television device 1120 comprises a display 1121, a camera or imaging device 1122 (either integrated with the TV 1120 or separate from the TV 1120), an application manager module 1125 for managing applications, such as application 1 1126, application 2 1127 up to application N 1128, N being a positive integer, and a display distribution module 1150. In one embodiment, the display distribution module 1150 performs content distribution and synchronization control processing for other television devices 1120, electronic devices 1-N 140, etc.

In one embodiment, the display 1121 may be a separate device from the television device 1120 or integrated with the television device 1120. In one embodiment, the camera 1122 may be a separate device from the television device 1120 or integrated with the television device 1120. In one embodiment, the network connection device 1110 may comprise a network interface, such as a network modem, router, etc. for handling communications between the television device and the server device 1130 and for forming a local network that the television device 1120 may be connected with.

In one embodiment, both transmitting device 1012 and receiving device 1011 may include some or all of the features of electronics devices 1-N 1140. In on embodiment, the electronic devices 1-N 1140 may comprises other TV devices 1120, mobile devices (e.g., smart phones, tablet devices, portable computing devices, wearable devices, etc.). In one embodiment, the electronic devices 1-N 1140 may comprise a display 1141, a camera 1142, input mechanisms (e.g., touchscreen, voice recognition, keyboards, remote control, etc.), communications circuitry, control circuitry, a global positioning system (GPS) receiver module, a microphone, audio output, and any other suitable components.

In one embodiment, all of the applications employed by display 1141, the input mechanism, the audio output and communications circuitry may be interconnected and managed by control circuitry. In one example, a hand held music player capable of transmitting content including video, music, etc. to other devices may be incorporated into the electronics devices 1-N 1140.

In one embodiment, the audio output may include any suitable audio component for providing audio to a user of any of the electronics devices 1-N 1140. For example, the audio output may include one or more speakers (e.g., mono or stereo speakers) built into an electronics device 1-N 1140. In some embodiments, the audio output may include an audio component that is remotely coupled to an electronics device 1-N 1140. For example, the audio output may include a headset, headphones or earbuds that may be coupled to communications device with a wire (e.g., coupled to an electronics device 1-N 1140 with a jack) or wirelessly (e.g., Bluetooth® headphones or a Bluetooth® headset).

In one embodiment, display 1141 may include any suitable screen or projection system for providing a display visible to the user. For example, display 1141 may include a screen (e.g., an LCD screen) that is incorporated in an electronics device 1-N 1140. As another example, display 1141 may include a movable display or a projecting system for providing a display of content on a surface remote from an electronics device 1-N 1140 (e.g., a video projector). Display 1141 may be operative to display content (e.g., information regarding communications operations or information regarding available media selections) under the direction of the control circuitry.

In one embodiment, the input mechanism of the electronic devices 1-N 1140 may be any suitable mechanism or user interface for providing user inputs or instructions to an electronics device 1-N 1140. Input mechanisms may take a variety of forms, such as a button, keypad, dial, a click wheel, or a touch screen. The input mechanisms may include a multi-touch screen. The input mechanism may include a user interface that may emulate a rotary phone or a multi-button keypad, which may be implemented on a touch screen or the combination of a click wheel or other user input device and a screen.

In one embodiment, the communications circuitry of the electronic devices 1-N 1140 may include any suitable communications circuitry operative to connect to a communications network (e.g., communications network 1010, FIG. 10) and to transmit communications operations and media from an electronics device 1-N 1140 to other devices within the communications network. The communications circuitry of the electronic devices 1-N 1140 may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, the communications circuitry of the electronic devices 1-N 1140 may be operative to create a communications network using any suitable communications protocol. For example, the communications circuitry may create a short-range communications network using a short-range communications protocol to connect to other communications devices. For example, the communications circuitry may be operative to create a local communications network using the Bluetooth® protocol to couple an electronics device 1-N 1140 with a Bluetooth® headset.

In one embodiment, the control circuitry of the electronic devices 1-N 1140 may be operative to control the operations and performance of an electronics device 1-N 1140. The control circuitry may include, for example, a processor, a bus (e.g., for sending instructions to the other components of an electronics devices 1-N 1140), memory, storage, or any other suitable component for controlling the operations of an electronics device 1-N 1140. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which an electronics device 1-N 1140 performs communications operations (e.g., saving contact information related to communications operations or storing information related to different media types and media items selected by the user).

In one embodiment, the control circuitry of the electronic devices 1-N 1140 may be operative to perform the operations of one or more applications implemented on an electronics device 1-N 1140. Any suitable number or type of applications may be implemented. Although the following discussion will enumerate different applications, it will be understood that some or all of the applications may be combined into one or more applications. For example, an electronics device 1-N 1140 may include an application connection application, a dialog application, a map application, a media application (e.g., QuickTime, MobileMusic.app, or MobileVideo.app). In some embodiments, an electronics device 1-N 1140 may include one or several applications operative to perform communications operations. For example, an electronics device 1-N 1140 may include a messaging application, a mail application, a telephone application, a voicemail application, an instant messaging application (e.g., for chatting), a videoconferencing application, a fax application, or any other suitable application for performing any suitable communications operation.

In some embodiments, an electronics device 1-N 1140 may include one or more microphones. For example, an electronics device 1-N 1140 may include a microphone to allow the user to transmit audio (e.g., voice audio) during a communications operation or as a means of establishing a communications operation or as an alternate to using a physical user interface. A microphone may be incorporated in an electronics device 1-N 1140, or may be remotely coupled to an electronics device 1-N 1140. For example, a microphone may be incorporated in wired headphones, or a microphone may be incorporated in a wireless headset.

In one embodiment, an electronics device 1-N 1140 may include any other component suitable for performing a communications operation. For example, an electronics device 1-N 1140 may include a power supply, ports or interfaces for coupling to a host device, a secondary input mechanism (e.g., an ON/OFF switch), or any other suitable component.

In one embodiment, a user may direct an electronics device 1-N 1140 to perform a communications operation using any suitable approach. As one example, a user may receive a communications request from another device (e.g., an incoming telephone call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

In one embodiment, an electronic device 1-N 1140 (N being a positive integer) may comprise a mobile device that may utilize mobile device hardware functionality including: a GPS receiver module, the camera 1142, a compass module, and an accelerometer and gyroscope module. The GPS receiver module of electronic devices 1-N 1140 may be used to identify a current location of the mobile device (i.e., user). The compass module is used to identify direction of the mobile device. The accelerometer and gyroscope module is used to identify tilt of the mobile device.

The system 1100 provides the TV 1120 and electronic devices 1-N 1140 (N being a positive integer) the ability to use one of the devices (e.g., TV device 1120, electronic devices 1-N 1140) within the display clustering network (e.g., a network formed from system 1100) to take a role of having server and client functionality at the same time. In one embodiment, the system 1100 is a clustering system, and distribution of at least a portion of a server's role (e.g., server 1130) may be performed by the TV 1120 or one of the electronic devices 1-N 1140 for handling synchronization (or sync) control for each incoming content (e.g., audio and video (A/V), text, graphics, etc.) by each group master device, which reduces a server device's overhead and complexity.

In one embodiment, server functionality is implemented within one of the cluster display devices (e.g., TV 1120 or any electronic device 1-N 1140), multiple content (e.g., A/V, text, graphics, etc.) rendering and sync control is provided. In one embodiment, a distributed sync master scheme is provided where the operating mechanism includes assigning a distributed sync master role to clients (e.g., the devices not performing the server functions in the system 1100) from a super master node (e.g., the device performing the server functions). In one example embodiment, a rendering ready status reporting mechanism from the clients to a distributed sync master node is employed. In one embodiment, a sync control mechanism is employed from the distributed sync master to its own sub clients. In one example embodiment, a super master's role is employed to perform a Sync Master function only for its own sub content group, and also having a client display role at the same time.

In another example embodiment, a central sync master scheme within a display cluster is employed. In one example embodiment, the super master's role is to perform sync master functions for all the content (e.g., A/V, text, graphics, etc.) in a background process without distributing the role to another display device as a normal computer based system with the client display role at the same time (because it is also a part of the display clustering network).

One or more embodiments eliminate typical server computer devices from being deployed in a display clustering system by taking on the server role by one of the display device clusters.

Figure 12:
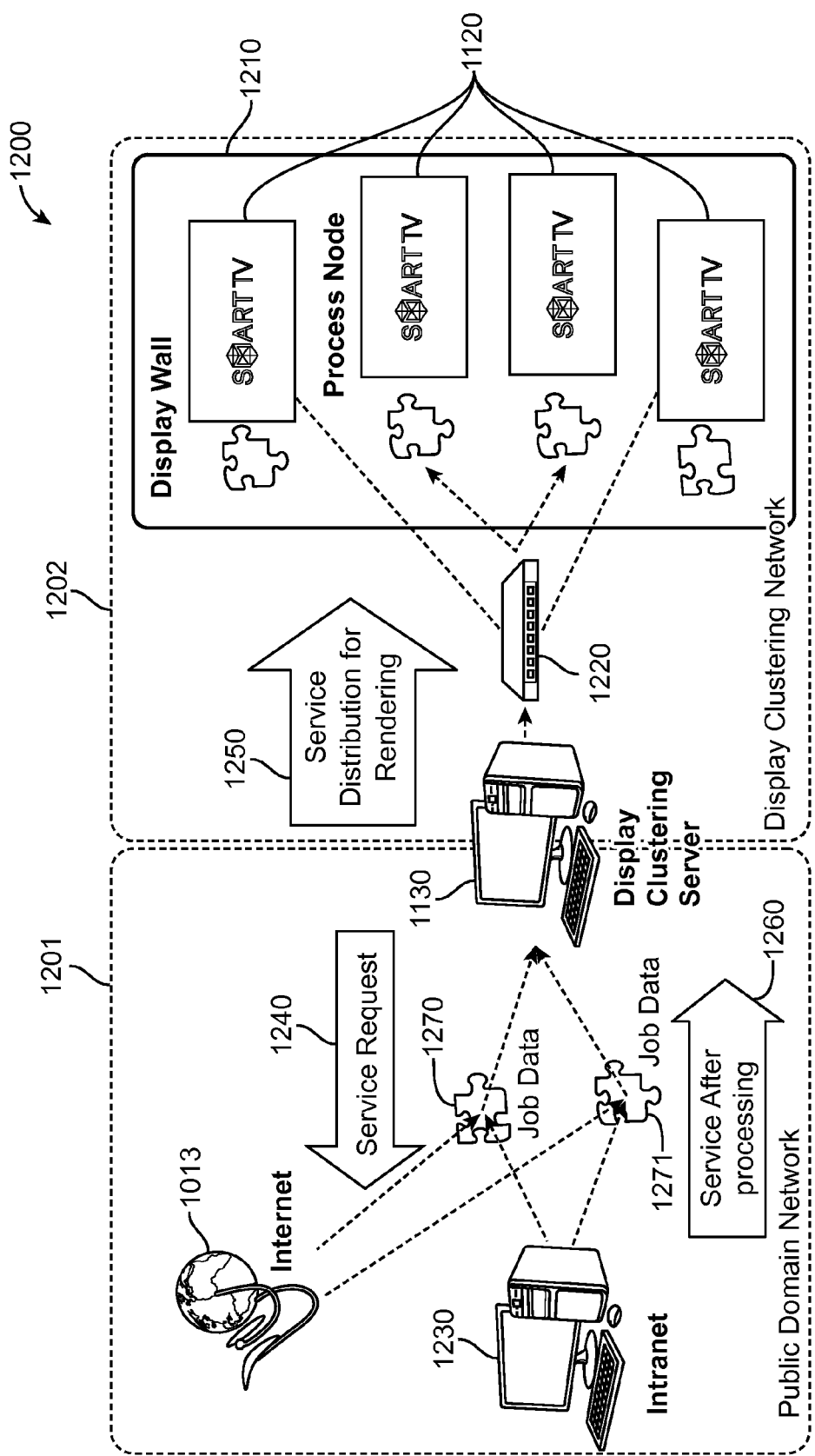
FIG. 12 shows a system including a display clustering server that performs processing for content distribution.

FIG. 12 shows a system 1200 including a display clustering server 1130 that performs processing for content distribution. In one example, the system includes a public domain network 1201 side and a display clustering network 1202 side. The display clustering server 1130 uses a distribution component 1220, such as a router, distribution hub, etc. The system 1200 includes access to content 1270 and 1271 from sources, such as the Internet 1013, an Intranet 1230, or any other server or system. The system includes television devices 1120 that make up a display wall 1210. In system 1200, the television devices 1120 do not include an implementation of the display distribution module 1150. In one example, the content sources (e.g., 1013, 1230, etc.) receive a service request 1240 from the display clustering server 1130, return service after processing 1260, and the display clustering server forwards service distribution for rendering 1250 to the television devices 1120.

In one example, all of the synchronization and content distribution processing is performed by the display clustering server 1130. In one example, the television devices 1120 are "dumb" devices and do not perform any synchronization or distribution processing for received content. The display clustering server 1130 is a central processing device that controls the display wall 1210, and has all of the controlling responsibility of the display clients (e.g., television devices 1120, content, and synchronization, etc.).

In the system 1200, even if distributed processing technology is implemented, the television devices 1120 only perform content decoding functionality, and the rendering time control and synchronization control is processed by the display clustering server 1130; and the control is still centralized to the display clustering server 1130.

Figure 13:
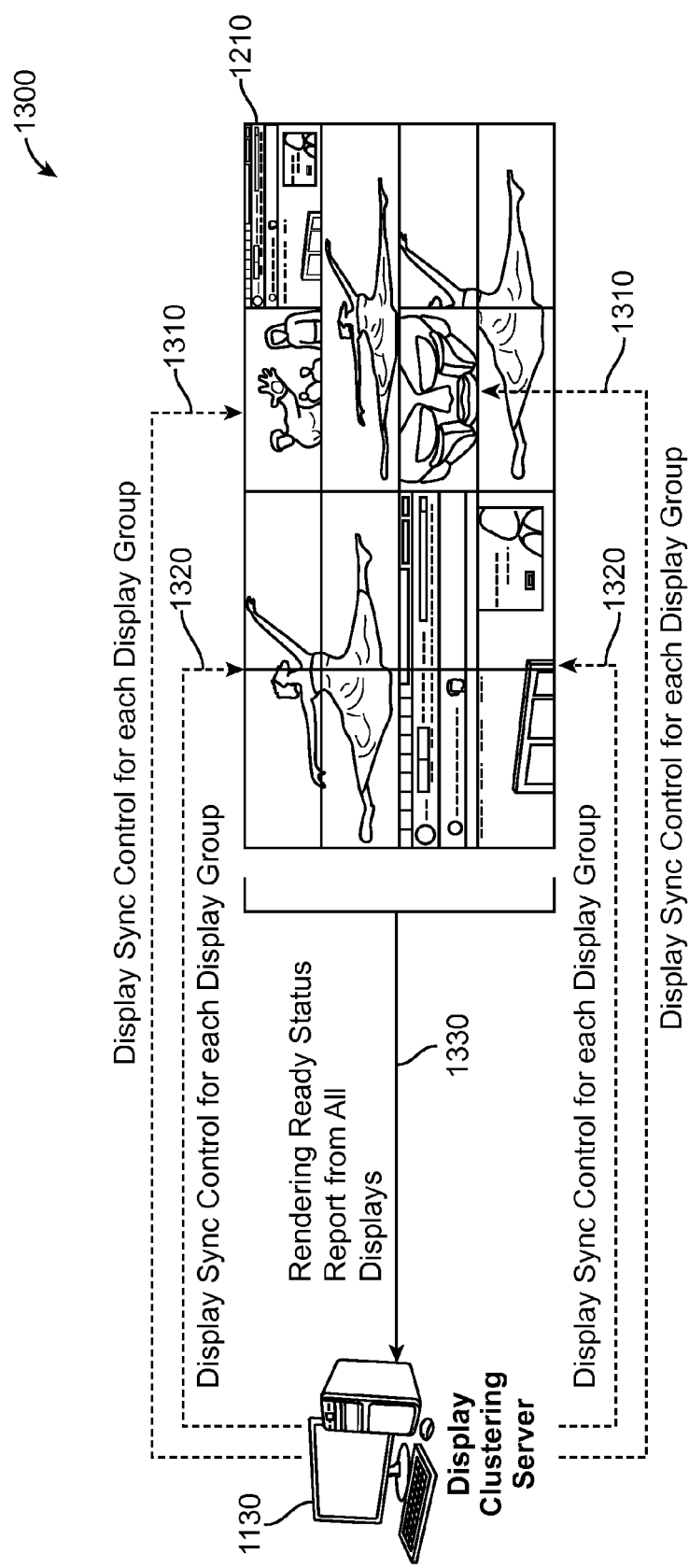
FIG. 13 shows synchronization control flow using the display clustering server.

FIG. 13 shows an example of synchronization control flow 1300 using the display clustering server 1130. As shown, the display devices (e.g., television devices 1120) of the display wall 1210 send/transmit a rendering ready status to the display clustering 1330 server 1130. The display clustering server 1130 processes received content and provides processing of display synchronization (sync) control 1310, 1320) for each display group (that includes multiple (e.g., 3, 4, etc.) display devices, such as television devices 1120).

Figure 14:
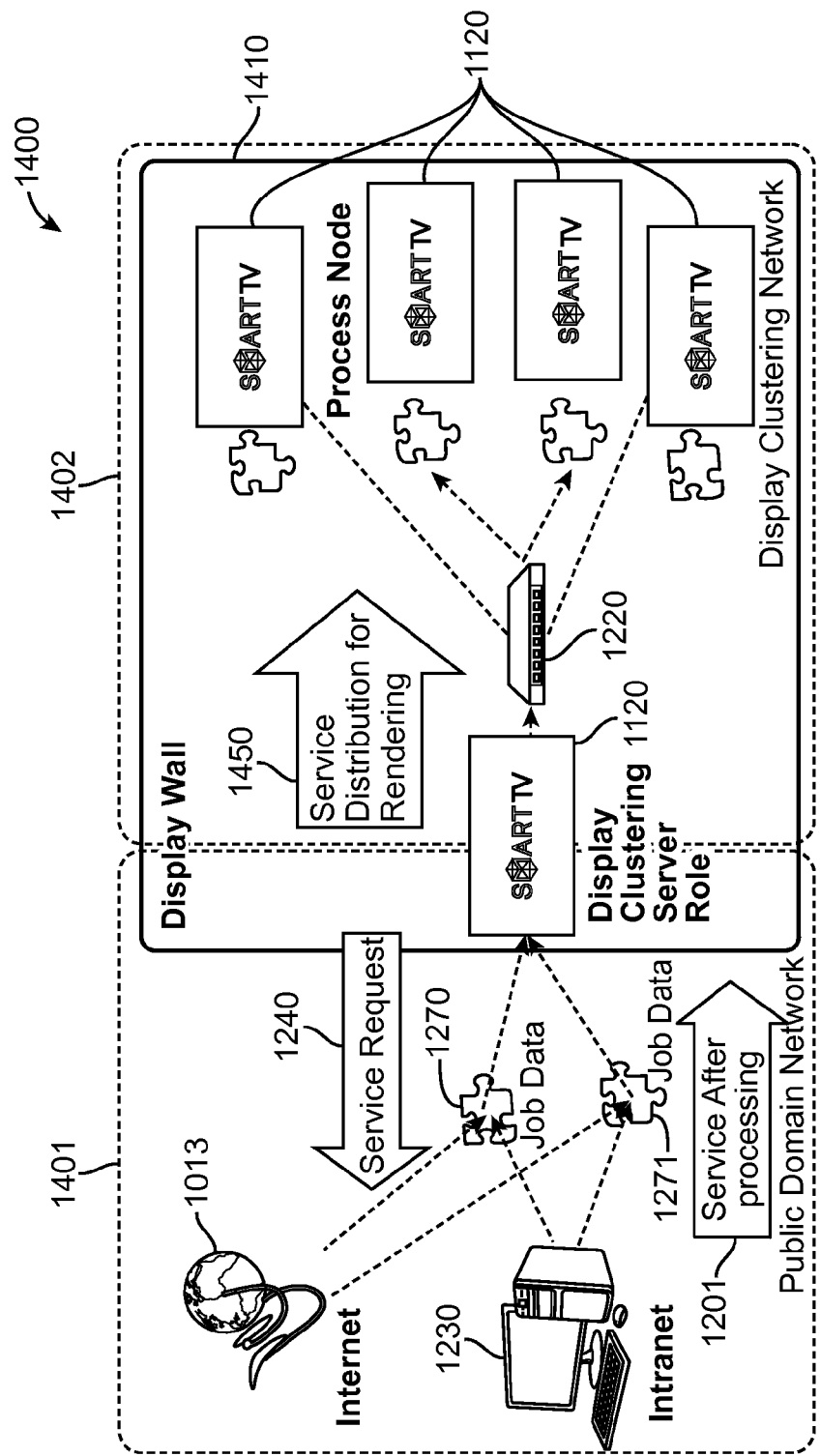
FIG. 14 shows a system architecture using a smart device that performs distributed processing for content distribution and synchronization control, according to one embodiment.

FIG. 14 shows an architecture for a system 1400 using a smart device/television (e.g., a television device 1120) that implements distributed processing for content distribution and synchronization control (e.g., implementing the display distribution module 1150) for a display wall 1410, according to one embodiment. In one embodiment, one particular television device 1120 with the distribution module 1150 takes on the role of the display clustering server (e.g., the display clustering server 1130, FIG. 12). In one embodiment, the public domain network 1401 side overlaps with the display clustering network 1402 side of the system 1400.

In one embodiment, the television device 1120 that assumed the role of the display clustering server performs processing for content distribution and synchronization control for service distribution for rendering 1450. In one example embodiment, the one particular television device 1120 that assumed the distributing device role performs processing and has the functionality as a server and a client, at the same time.

In one embodiment, because the system 1400 is a clustering system, distributing a portion of a typical distributing and synchronization server's role to one or more other display devices (e.g., television devices 1120 that include the distribution module 1150) to handle synchronization control for each incoming content by each group master device (i.e., a television device 1120 that assumes the role or is assigned the role of a synchronization master device) reduces use of a server device that would otherwise be used for content distribution and display synchronization control, and reduces overhead and system complexity (e.g., if the display clustering server is removed or not included in the clustering network or system).

In one example embodiment, where multiple content display configuration scenarios may exist, one master display device (e.g., a television device 1120 including the distribution module 1150) may not perform the synchronization master (device) role for all the received content (from one or more sources). In one example embodiment, the master synchronization display device only provides processing as a synchronization master for content and the master synchronization display device does not process content for other display groups because the master synchronization device is also a display device (e.g., a television device 1120) of a display group that is currently rendering content on its display. Therefore, in one embodiment, another dedicated synchronization master display device (e.g., a television device 1120 including a distribution module 1150) is required to handle processing (and synchronization) for other content for a display group. In one example embodiment, each display device (e.g., a television device 1120 including a distribution module 1150) may be a synchronization master display device for each different content received from one or more sources and they may be supported with a flexible synchronization master assignment mechanism from a super master node or display device for the display clustering network 1402.

Figure 15:
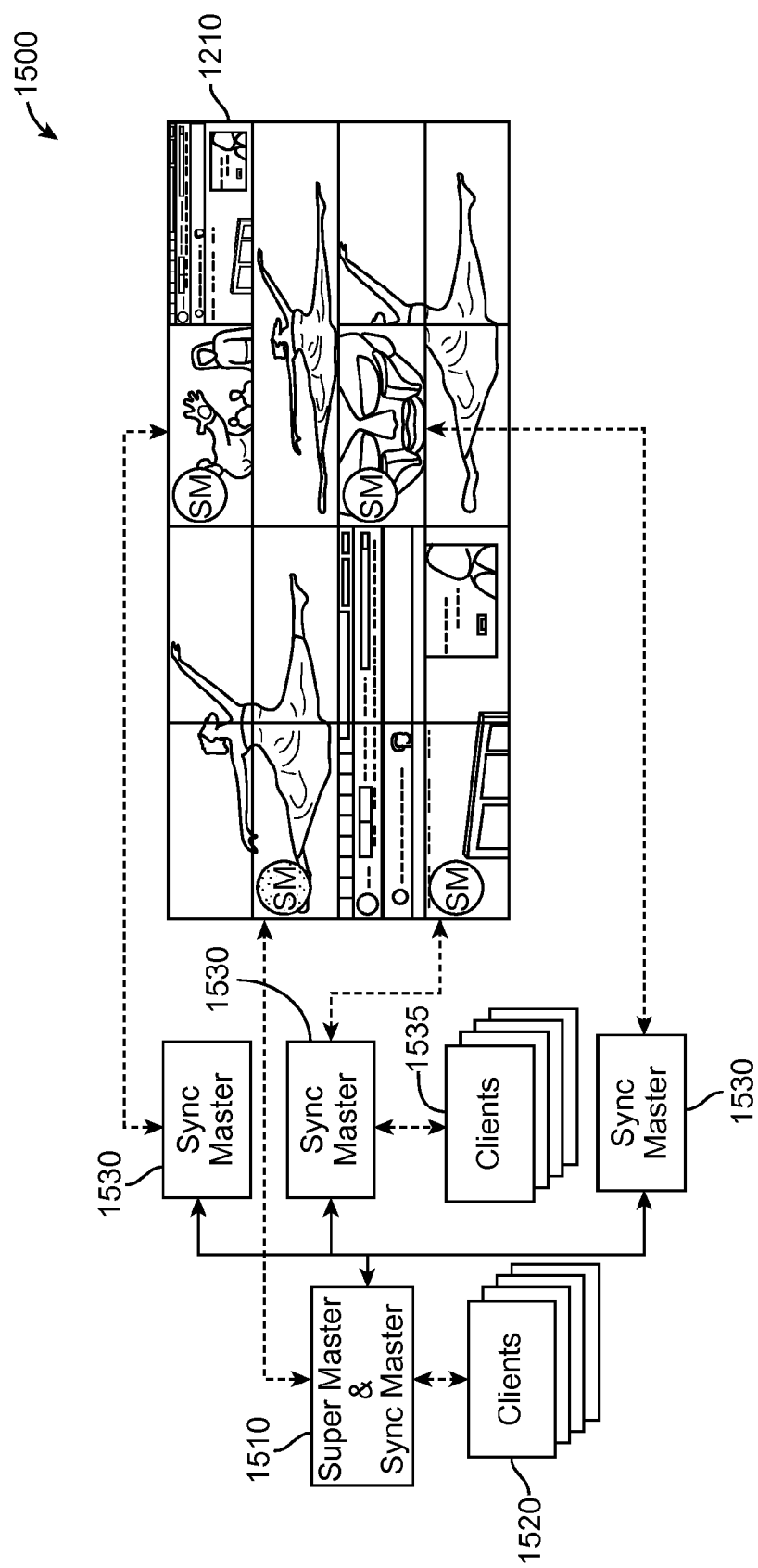
FIG. 15 shows a high-level system architecture for synchronization master authority assignment and control, according to one embodiment.

FIG. 15 shows a high-level clustering system 1500 architecture for synchronization master authority assignment and control in a display clustering network, according to one embodiment. In one example embodiment, four (4) different content from one or more sources are running or being displayed on the display wall 1210 of the clustering system 1500. In one example, each content occupies displays as follows: content of a ballerina occupies nine (9) display devices (e.g., a television device 1120 including a distribution module 1150), Web browsing content occupies five (5) display devices, content of a masked man occupies one (1) display device, and "Heroes" occupy one (1) display device.

In one embodiment, a master display device takes a synchronization master role 1530 for all of the clients 1520 (other television devices 1120 that may or may not include a distribution module 1150) of displays for the ballerina content; another synchronization master display device takes a synchronization master display device role 1530 for each content group displays. In one embodiment, one particular display device 1510 (e.g., a television device 1120 including a distribution module 1150) takes on the synchronization master display device role for the clients 1520 in its display group, and is also assigned a role of super master synchronization display device for the other master synchronization display devices 1530 and the clients 1535 of the different display groups for processing distribution of the content and synchronization control.

In one embodiment, the assignment of the super master synchronization display device role is manually assigned by a user. In one embodiment, the assignment of the super master synchronization display device role is defaulted to a particular display device based on connection (e.g., order of connectivity from/to a connection for receiving the content from a source), wired connection versus wireless connection (e.g., defaults to either a wire connected or a wireless connected device with a particular device), automatically selected based on processing overhead or bandwidth, automatically selected based on hardware availability (e.g., available memory, processing speed, etc.), based on geographic location within the display wall 1210 (e.g., selected based on center location, top left location, top right location, bottom left location, bottom right location, etc.), randomly selected, based on the number of client display devices in a display group (e.g., least to most, most to least, etc.), etc.

In one embodiment, the role of synchronization master display device 1530 for all of the clients 1520 in the display wall 1210 may be assigned to an assigned super master synchronization display device 1510 for centralized control and synchronization performed by a television device 1120 including a display distribution module 1150.

Figure 16:
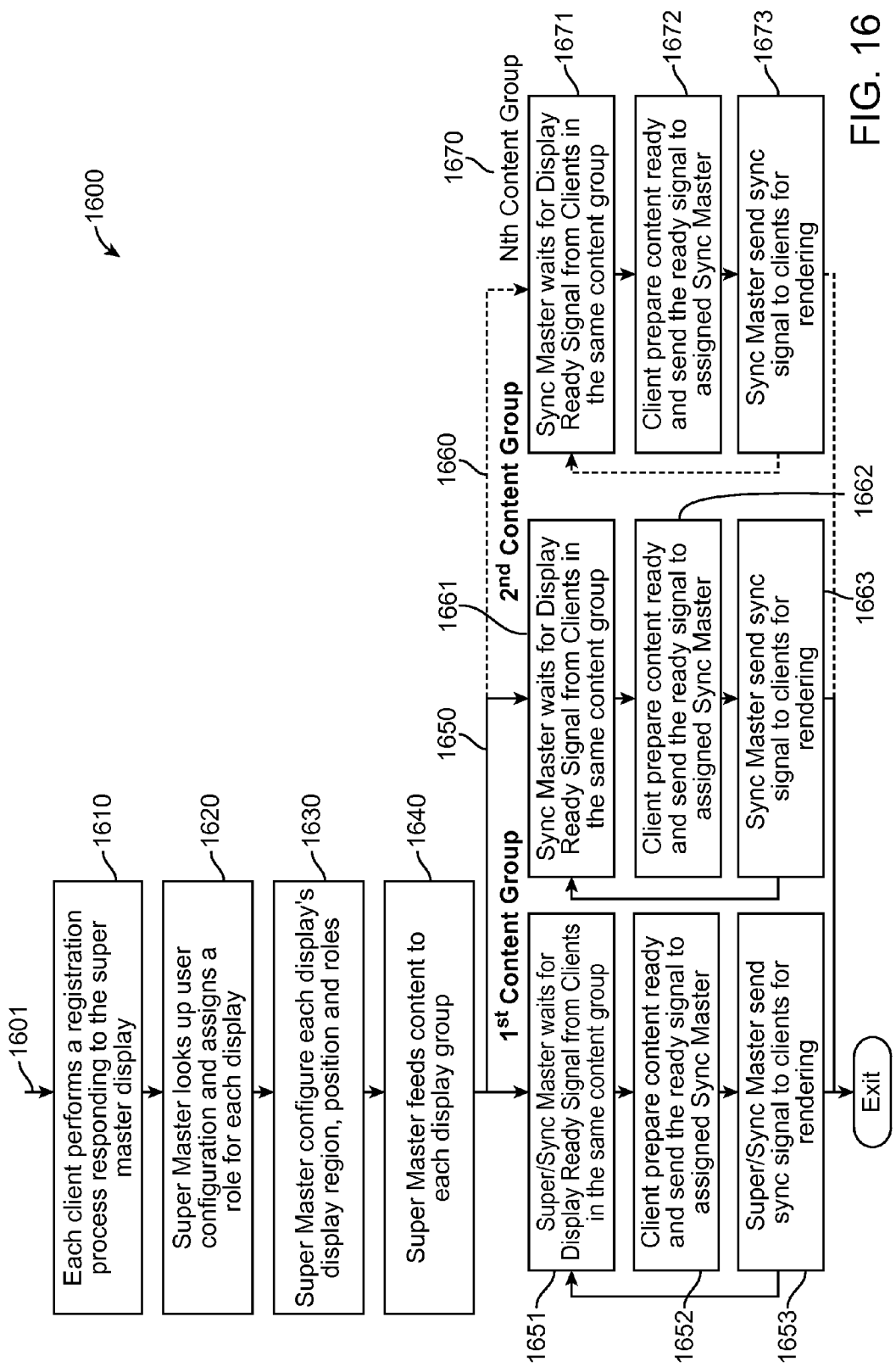
FIG. 16 shows a process flow for synchronization master assignment and operation, according to one embodiment.

FIG. 16 shows a process flow for synchronization master assignment and operation process 1600, according to one embodiment. In one embodiment, once the display cluster network has booted up at 1601, each client performs a registration process at block 1610 with the super master synchronization display device. In one embodiment, for registration, the super master synchronization display device broadcasts packets (e.g., address resolution protocol (ARP) type packets) to all client display devices, and each client display device responds to the super master synchronization display device for completing the initial registration process.

In one embodiment, in block 1620, after registration is completed, the super master synchronization display device determines user configuration information, and in block 1630 assigns each client display device's role and the geometrical rendering responsibility (e.g., where in a display group is specific content rendered/displayed) for each client display device based on the configuration data. In one embodiment, the configuration data is programmed by a user, downloaded from a content source, determined based on geographic location of display devices, orientation of display devices, etc.).

In one embodiment, in block 1640 the super master synchronization display device feeds the content to each display group. In one example embodiment, if there is four (4) different content that is being received in the display clustering network, the super master synchronization display device provides a packet distributor role and sync master role for one content, and the other three (3) display devices provide the sync master role for each other content.

In one embodiment, at 1650 for the first content group, in block 1651 once the super master synchronization display device role is assigned to a display device, the display device waits to obtain a rendering ready signal from clients in the first content display group. In one embodiment, in block 1652 the clients prepare a content ready signal and send the ready signal to the assigned super master synchronization display device. In one embodiment, in block 1653 the super master synchronization display device (which is simultaneously the master synchronization device for its clients in the display group), sends a sync signal to its own group of client display devices for rendering the content on the display devices.

In one embodiment, at 1660, for the second content display group, in block 1661 the group synchronization master display device waits to obtain a rendering ready signal from clients in the second content display group. In one embodiment, in block 1662 the clients prepare a content ready signal and send the ready signal to the assigned synchronization master display device. In one embodiment, in block 1663 the synchronization master display device sends a sync signal to its own group of client display devices for rendering the content on the display devices.

In one embodiment, at 1670, for the Nth (n being a positive integer greater than 2) content display group, in block 1671 the group synchronization master display device waits to obtain a rendering ready signal from clients in the Nth content display group. In one embodiment, in block 1672 the clients prepare a content ready signal and send the ready signal to the assigned synchronization master display device. In one embodiment, in block 1673 the synchronization master display device sends a sync signal to its own group of client display devices for rendering the content on the display devices.

In one embodiment, the rendering ready signal from clients and sync signal may be received to the super master synchronization display device or not, depending on implementation and/or user selection.

It is an exactly same architecture against computer based display clustering system from sync control perspective because all the sync control is done by only one dedicated server, but only one different thing is that the clustering server (sync control server) is also a part of the display clustering.

Figure 17:
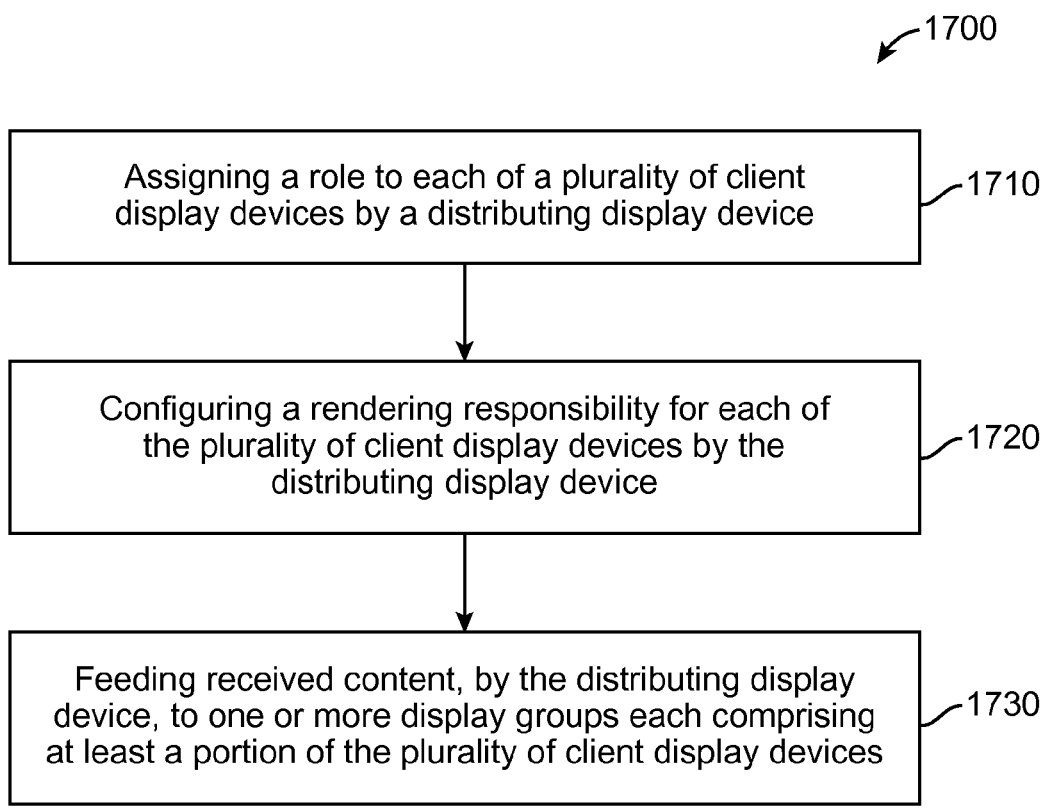
FIG. 17 shows a flow diagram for a process including distributing server functionality to a smart device for synchronization control and display clustering, according to one embodiment.

FIG. 17 shows a flow diagram for a process 1700 including distributing server functionality to a smart device (e.g., a television device 1120 with a display distribution module 1150) for synchronization control and display clustering, according to one embodiment. In one embodiment, in block 1710 a role is assigned to each of a plurality of client display devices by a distributing display device (e.g., a super master synchronization display device). In one embodiment, in block 1720 a rendering responsibility is configured for each of the plurality of client display devices by the distributing display device. In one embodiment, in block 1730 received content is fed, by the distributing display device, to one or more display groups each comprising at least a portion of the plurality of client display devices.

In one embodiment, process 1700 further includes registering the plurality of client display devices with the distributing display device. In one embodiment, registering includes transmitting information packets to the plurality of client devices from the distributing display device, and the plurality of client devices responding to the distributing display device to complete the registration process for the plurality of client devices.

In one embodiment, process 1700 further includes assigning a synchronization master role to a particular client display device in each display group. In one embodiment, a synchronization master role is also assigned to the distributing display device for one particular display group, and a synchronization super master role is additionally assigned to the distributing display device for the one particular display group.

In one embodiment, process 1700 further includes receiving, by the synchronization super master and each synchronization master, a display ready signal from respective client display devices in respective display groups. In one embodiment, a synchronization signal is sent by the synchronization super master and each synchronization master to the respective client display devices for rendering content on the respective client display devices of the respective display groups.

In one embodiment, process 1700 further includes assigning a synchronization super master role to the distributing display device, receiving, by the synchronization super master, a display ready signal from the plurality of client display devices, and sending a synchronization signal, by the synchronization super master to the plurality of client display devices for rendering content on the plurality of client display devices.

In one embodiment, in process 1700 the received content comprises a plurality of same or different content from one or more sources. In one example embodiment, each display device of each group renders the same or the different content from the one or more sources.

FIG. 18 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device such as a mobile phone, the system 500 further includes an image capture device 520, such as a camera 1122 or 1142 (FIG. 11), and an audio capture device 519, such as a microphone. The system 500 may further include application modules as MMS module 521, SMS module 522, email module 523, social network interface (SNI) module 524, audio/video (AV) player 525, web browser 526, image capture module 527, etc.

The system 500 further includes a content distribution and sync processing module 530 as described herein, according to an embodiment. In one implementation of the content distribution and sync processing module 530 along with an operating system 529 may be implemented as executable code residing in a memory of the system 500. In another embodiment, such modules are in firmware, etc. In one embodiment, the content distribution and sync processing implements processing similar to process 1600 and/or process 1700, and may include implementation of the display distribution module 1150 (FIG. 11).

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for content rendering in a clustered display network, comprising:
  receiving, at a distributing display device, a first assigned role of synchronization master display device for a first display group of client display devices;
  receiving, at the distributing display device, a second assigned role of super master synchronization display device for the first display group and one or more additional display groups of client display devices;
  assigning, by the distributing display device, for each additional display group, a role of synchronization master display device the additional display group to a client display device in the additional display group, wherein the client display device is configured to provide synchronization control for content fed to the additional display group;
  configuring, by the distributing display device, a rendering responsibility for each client display device of the first display group and each client display device of the one or more additional display groups;
  feeding received content, by the distributing display device, to the first display group and the one or more additional display groups; and
  providing synchronization control, by the distributing display device, for content fed to the first display group.

2. The method of claim 1, further comprising:
  registering, with the distributing display device, each client display device in the first display group and each client display device in the one or more additional display groups, wherein the registering comprises:
    transmitting, from the distributing display device, information packets to each client display device in the first display group and each client display device in the one or more additional display groups; and
    receiving, at the distributing display device, a response from each client display device in the first display group and each client display device in the one or more additional display groups to complete the registering.

3. The method of claim 2, wherein transmitting, from the distributing display device, information packets to each client display device in the first display group and each client display device in the one or more additional display groups comprises:
  broadcasting address resolution protocol (ARP) packets to each client display device in the first display group and each client display device in the one or more additional display groups.

4. The method of claim 1, wherein the distributing display device is configured to perform both server functions and client display device functions at a same time.

5. The method of claim 1, wherein the providing synchronization control, by the distributing display device, for content fed to the first display group comprises:
  receiving, at the distributing display device, a display ready signal from each client display device in the first display group; and
  sending, from the distributing display device, a synchronization signal to each client display device in the first display group for rendering the content fed to the first display group.

6. The method of claim 1, wherein each synchronization master display device for each display group is configured to provide synchronization control for content fed to the display group by:
  receiving, a display ready signal from each client display device in the display group; and
  sending a synchronization signal to each client display device in the display group for rendering the content fed to the display group.

7. The method of claim 1, wherein the received content comprises a plurality of content pieces from one or more sources, the plurality of content pieces comprising same or different content pieces.

8. The method of claim 7, wherein each client display device in the first display group and each client display device in the one or more additional display groups is configured to render the plurality of content pieces.

9. The method of claim 1, wherein the distributing display device, each client display device in the first display group, and each client display device in the one or more additional display groups comprise television devices.

10. The method of claim 9, wherein the television devices form a display wall.

11. The method of claim 1, wherein:
  the first display group and the one or more additional display groups are grouped by content sources to be displayed such that each of the content sources is assigned a particular display group.

12. An apparatus comprising:
  a display;
  one or more processors; and
  non-transitory processor-readable memory device storing instructions that when executed by the one or more processors cause the one or more processors to perform operations including:
    receiving a first assigned role of synchronization master display device for a first display group of client display devices;
    receiving a second assigned role of super master synchronization display device for the first display group and one or more additional display groups of client display devices;
    assigning, for each additional display group, a role of synchronization master display device for the additional display group to a client display device in the additional display group, wherein the client display device is configured to provide synchronization control for content fed to the additional display group;
    configuring a rendering responsibility for each client display device of the first display group and each client display device of the one or more additional display groups;
    feeding received content to the first display group and the one or more additional display groups; and
    providing synchronization control for content fed to the first display group.

13. The apparatus of claim 12, wherein the operations further include:
  registering each client display device in the first display group and each client display device in the one or more additional display groups, wherein the registering comprises:
    transmitting information packets to each client display device in the first display group and each client display device in the one or more additional display groups; and receiving a response from each client display device in the first display group and each client display device in the one or more additional display groups to complete the registering.

14. The apparatus of claim 12, wherein the apparatus is configured to perform both server functions and client display device functions at a same time.

15. The apparatus of claim 14, wherein the providing synchronization control for content fed to the first display group comprises:
receiving a display ready signal from each client display device in the first display group; and
sending a synchronization signal to each client display device in the first display group for rendering the content fed to the first display group.

16. The apparatus of claim 12, wherein each synchronization master display device for each display group is configured to provide synchronization control for content fed to the display group by:
receiving a display ready signal from each client display device in the display group; and
sending a synchronization signal to each client display device in the display group for rendering the content fed to the display group.

17. The apparatus of claim 12, wherein the received content comprises a plurality of content pieces from one or more sources, the plurality of content pieces comprising same or different content pieces.

18. The apparatus of claim 17, wherein each client display device in the first display group and each client display device in the one or more additional display groups is configured to render the plurality of content pieces.

19. The apparatus of claim 12, wherein the apparatus comprises a smart television device.

20. The apparatus of claim 12, wherein the apparatus, each client display device in the first display group, and each client display device in the one or more additional display groups comprise television devices, and the television devices form a display wall.

21. A non-transitory computer-readable medium that includes a program that when executed on a computer performs a method comprising:
receiving, at a distributing display device, a first assigned role of synchronization master display device for a first display group of client display devices;
receiving, at the distributing display device, a second assigned role of super master synchronization display device for the first display group and one or more additional display groups of client display devices;
assigning, by the distributing display device, for each additional display group, a role of synchronization master display device for the additional display group to a client display device in the additional display group, wherein the client display device is configured to provide synchronization control for content fed to the additional display group;
configuring, by the distributing display device, a rendering responsibility for each client display device of the first display group and each client display device of the one or more additional display groups;
feeding received content, by the distributing display device, to the first display group and the one or more additional display groups; and
providing synchronization control, by the distributing display device, for content fed to the first display group.

22. The non-transitory computer-readable medium of claim 21, the method further comprising:
registering, with the distributing display device, each client display device in the first display group and each client display device in the one or more additional display groups, wherein the registering comprises:
transmitting, from the distributing display device, information packets to each client display device in the first display group and each client display device in the one or more additional display groups; and
receiving, at the distributing display device, a response from each client display device in the first display group and each client display device in the one or more additional display groups to complete the registering.

23. The non-transitory computer-readable medium of claim 22, wherein the providing synchronization control, by the distributing display device, for content fed to the first display group comprises:
receiving, at the distributing display device, a display ready signal from each client display device in the first display group; and
sending, from the distributing display device, a synchronization signal to each client display device in the first display group for rendering the content fed to the first display group.

24. The non-transitory computer-readable medium of claim 22, wherein each client display device assigned a role of sychronization master display device for an additional display group is configured to provide synchronization control for content fed to the additional display group by:
receiving, at the client display device, a display ready signal from each client display device in the additional display group; and
sending, from the client display device, a synchronization signal to each client display device in the additional display group for rendering the content fed to the additional display group.

25. The non-transitory computer -readable medium of claim 22, wherein the received content comprises a plurality of content pieces from one or more sources, the plurality of content pieces comprising same or different content pieces, and each client display device in the first display group and each client display device in the one or more additional display groups is configured to render the plurality of content pieces.

26. The non-transitory computer-readable medium of claim 22, wherein the distributing display device comprises a smart television device.

27. The non-transitory processor-readable medium of claim 22, wherein transmitting, from the distributing display device, information packets to each client display device in the first display group and each client display device in the one or more additional display groups comprises:
broadcasting address resolution protocol (ARP) packets to each client display device in the first display group and each client display device in the one or more additional display groups.

28. The non-transitory computer-readable medium of claim 22, wherein the distributing display device, each client display device in the first display group, and each client display device in the one or more additional display groups comprise television devices.

29. The non-transitory computer-readable medium of claim 28, wherein the television devices form a display wall.

\* \* \* \* \*